US012350986B2

(12) United States Patent  
ten Broeke et al.

(10) Patent No.: US 12,350,986 B2  
(45) Date of Patent: Jul. 8, 2025

(54) FLEXIBLE SPRING MEMBER AND END CLOSURE ASSEMBLIES AS WELL AS GAS SPRING AND GAS DAMPER ASSEMBLIES INCLUDING SAME

(71) Applicant: Firestone Industrial Products Company, LLC, Nashville, TN (US)

(72) Inventors: Edger ten Broeke, Sinderen (NL); Joshua R. Leonard, Noblesville, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 440 days.

(21) Appl. No.: 18/007,517

(22) PCT Filed: Jun. 1, 2021

(86) PCT No.: PCT/US2021/035165  
§ 371 (c)(1),  
(2) Date: Dec. 1, 2022

(87) PCT Pub. No.: WO2021/247514  
PCT Pub. Date: Dec. 9, 2021

(65) Prior Publication Data  
US 2023/0311603 A1  Oct. 5, 2023

Related U.S. Application Data

(60) Provisional application No. 63/033,177, filed on Jun. 1, 2020.

(51) Int. Cl.  
*B60G 11/27* (2006.01)  
*B60G 11/30* (2006.01)  
(Continued)

(52) U.S. Cl.  
CPC .............. *B60G 11/27* (2013.01); *B60G 11/30* (2013.01); *F16F 9/0454* (2013.01); *F16F 9/049* (2013.01);  
(Continued)

(58) Field of Classification Search  
CPC .. B60G 11/27; B60G 11/30; B60G 2202/242; B60G 2202/152; B60G 2202/154;  
(Continued)

(56) References Cited

U.S. PATENT DOCUMENTS 5,060,916 A    10/1991  Koschinat  
10,369,855 B2 *  8/2019  Moulik .............. B60G 17/0521  
(Continued)

OTHER PUBLICATIONS

International Search Report and Written Opinion dated Sep. 24, 2021 issued by EPO in connection with corresponding International Application No. PCT/US2021/035165.

*Primary Examiner* — Vishal R Sahni

(57) ABSTRACT

Flexible spring member and end closure assemblies include a flexible spring member-defining a spring chamber. An end closure body includes an outer peripheral surface portion and an elongated damping passage extending axially into end closure wall in a spiral arrangement about longitudinal axis. End closure body is positioned along an end of flexible spring member with flexible wall permanently attached along outer peripheral surface portion such that a substantially fluid-tight joint is formed between flexible spring member and end closure body. Gas spring and gas damper assemblies as well as methods of assembly are also included.

20 Claims, 15 Drawing Sheets

(51) Int. Cl.
*F16F 9/04* (2006.01)
*F16F 9/05* (2006.01)
(52) U.S. Cl.
CPC ........ *F16F 9/057* (2013.01); *B60G 2202/152* (2013.01); *B60G 2202/154* (2013.01); *B60G 2202/242* (2013.01); *B60G 2204/126* (2013.01)
(58) Field of Classification Search
CPC .......... B60G 2228/001; B60G 2228/04; B60G 2204/126; B60G 2500/10
See application file for complete search history.

(56) References Cited

U.S. PATENT DOCUMENTS

| | | | |
|---|---|---|---|
| 2017/0248187 A1 | 8/2017 | Leonard | |
| 2018/0187739 A1* | 7/2018 | Leonard | .................. F16F 9/365 |
| 2018/0297431 A1* | 10/2018 | Leonard | ................. B60G 11/27 |
| 2018/0304711 A1* | 10/2018 | Leonard | ................. F16F 9/057 |

* cited by examiner

FLEXIBLE SPRING MEMBER AND END CLOSURE ASSEMBLIES AS WELL AS GAS SPRING AND GAS DAMPER ASSEMBLIES INCLUDING SAME

This application is the National Stage of International Application No. PCT/US2021/035165, filed on Jun. 1, 2021, which claims the benefit of priority from U.S. Provisional Patent Application No. 63/033,177, filed on Jun. 1, 2020, the entire contents of which is hereby incorporated herein by reference.

BACKGROUND

The subject matter of the present disclosure broadly relates to the art of gas spring devices and, more particularly, to flexible spring member and end closure assemblies that include an elongated damping passage. Gas spring and gas damper assemblies and methods of assembly that include such flexible spring member and end closure assemblies are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with suspension systems for non-wheeled vehicles and/or support structures and height adjusting systems associated with industrial machinery, components thereof and/or other such equipment. Accordingly, the subject matter of the present disclosure is not intended to be limited to applications and/or uses associated with suspension systems of wheeled vehicles, which as discussed herein are merely exemplary.

Wheeled motor vehicles of most types and kinds include a sprung mass, such as a body or chassis, for example, and an unsprung mass, such as two or more axles or other wheel-engaging members, for example, with a suspension system disposed therebetween. Typically, such a suspension system will include a plurality of spring devices as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In many applications involving vehicle suspension systems, it may be desirable to utilize spring elements that have as low of a spring rate as is practical, as the use of lower spring rate elements can provide improved ride quality and comfort compared to spring elements having higher spring rates. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of road inputs into the sprung mass and will, thus, provide a more comfortable ride.

Such suspension systems also commonly include one or more dampers or damping components that are operative to dissipate energy associated with undesired inputs and movements of the sprung mass, such as road inputs occurring under dynamic operation of a vehicle, for example. Typically, such dampers are liquid filled and operatively connected between a sprung and unsprung mass, such as between a body and axle of a vehicle, for example. One example of such damping components are conventional shock absorbers that are commonly used in vehicle suspension systems.

In other arrangements, however, the dampers or damping components can be of a type and kind that utilizes gas rather than liquid as the working medium. In such known constructions, the gas damper portion permits gas flow between two or more volumes of pressurized gas through one or more passages or ports. Generally, there is some resistance to the movement of pressurized gas through these passages or ports, and this resistance acts to dissipate energy associated with the gas spring portion and thereby provide some measure of damping.

Notwithstanding any usage and/or success of known constructions, it is desired to develop gas spring and gas damper assemblies as well as a suspension system including one or more of such assemblies that overcome difficulties associated with known constructions, and/or which may otherwise advance the art of gas spring and gas damper assemblies and/or suspension systems including the same.

BRIEF DESCRIPTION

One example of a flexible spring member and end closure assembly in accordance with the subject matter of the present disclosure can include a flexible spring member having a longitudinal axis. The flexible spring member can include a flexible wall extending longitudinally between first and second ends and peripherally about the longitudinal axis to at least partially define a spring chamber. An end closure body can include an end closure wall oriented transverse to the longitudinal axis with a first surface portion facing axially toward the spring chamber and a second surface portion facing axially away from the spring chamber. The end closure body also includes an outer peripheral surface portion and an elongated damping passage extending axially into the end closure wall in a spiral arrangement about the longitudinal axis. The end closure body positioned along the second end of the flexible spring member with the flexible wall permanently attached along the outer peripheral surface portion of the end closure body such that a substantially fluid-tight joint is formed between the flexible spring member and the end closure body.

One example of a gas spring and gas damper assembly in accordance with the subject matter of the present disclosure can include a flexible spring member having a longitudinal axis. The flexible spring member can include a flexible wall extending longitudinally between first and second ends and peripherally about the longitudinal axis to at least partially define a spring chamber. An end closure body can include an end closure wall oriented transverse to the longitudinal axis with a first surface portion facing axially toward the spring chamber and a second surface portion facing axially away from the spring chamber. The end closure body also includes an outer peripheral surface portion and an elongated damping passage extending axially into the end closure wall in a spiral arrangement about the longitudinal axis. The end closure body positioned along the second end of the flexible spring member with the flexible wall permanently attached along the outer peripheral surface portion of the end closure body such that a substantially fluid-tight joint is formed between the flexible spring member and the end closure body. A first end member can be operatively secured to the first end of the flexible spring member such that a substantially fluid-tight seal is formed therebetween. Additionally, or in the alternative, a second end member can be disposed in spaced relation to the first end member. The second end member can include an end member wall that at least partially defines an end member chamber within the second end member. The end member wall can include an inner wall portion at least partially defining an open end of the end member chamber disposed toward the spring chamber. The end closure body can be oriented transverse to the longitudinal axis. The end closure body can include a first surface portion facing axially toward the spring chamber and a second surface portion facing axially toward the end member chamber. The end closure body can also include an outer peripheral surface portion, and an elongated damping passage extending axially into the end closure wall in a spiral arrangement about the longitudinal axis. The end closure body can be disposed within the open end of the second end member such that the second end of the flexible spring member is compressively captured between the outer peripheral surface portion of the end closure body and the inner wall portion of the end member wall.

In some cases, a gas spring and gas damper assembly in accordance with foregoing paragraph can include an end closure assembly can include the end closure body and a cover plate.

One example of a method of assembling a gas spring and gas damper assembly in accordance with the subject matter of the present disclosure can include providing a flexible spring member that has a longitudinal axis and includes a flexible wall with an end. The method can also include providing an end closure body including a first surface portion, a second surface portion facing opposite the first surface portion, an outer peripheral surface portion, and an elongated damping passage extending axially into the end closure wall in a spiral arrangement about the longitudinal axis. The method can further include permanently attaching the end of the flexible wall to the outer peripheral surface portion of the end closure body thereby forming a flexible spring member and end closure assembly that at least partially defines a spring chamber. The method can also include providing an end member that includes an end member wall at least partially defining an end member chamber. The method can further include attaching the flexible spring member and end closure assembly to the end member such that the spring chamber and the end member chamber are disposed in fluid communication with one another through the elongated gas damping passage.

DETAILED DESCRIPTION

Turning now to the drawings, it is to be understood that the showings are for purposes of illustrating examples of the subject matter of the present disclosure and that the examples shown are not intended to be limiting. Additionally, it will be appreciated that the drawings are not to scale and that portions of certain features and/or elements may be exaggerated for purpose of clarity and ease of understanding.

Figure 1:
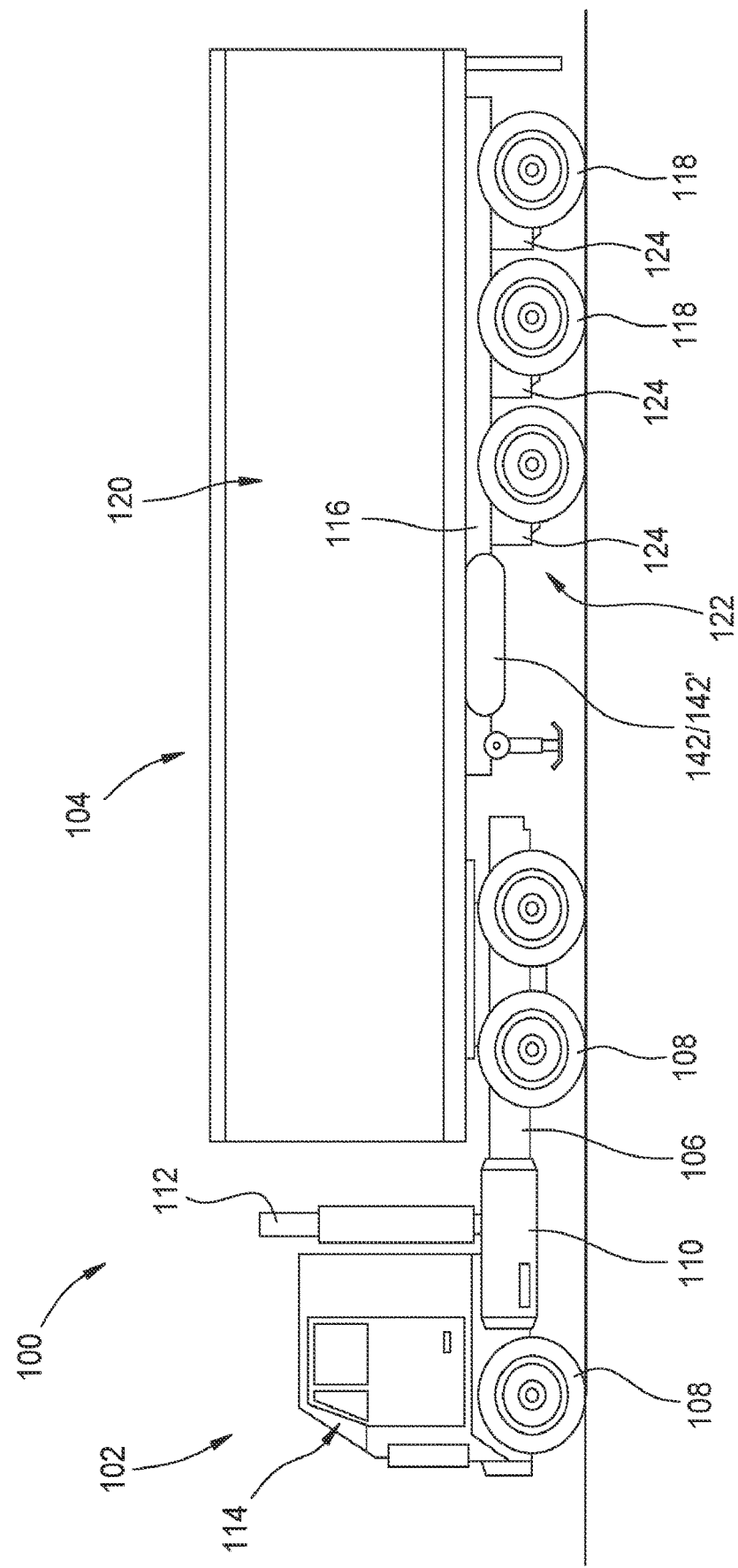
FIG. 1 is a schematic representation of one example of a vehicle that includes one or more suspension systems in accordance with the subject matter of the present disclosure.
Figure 2:
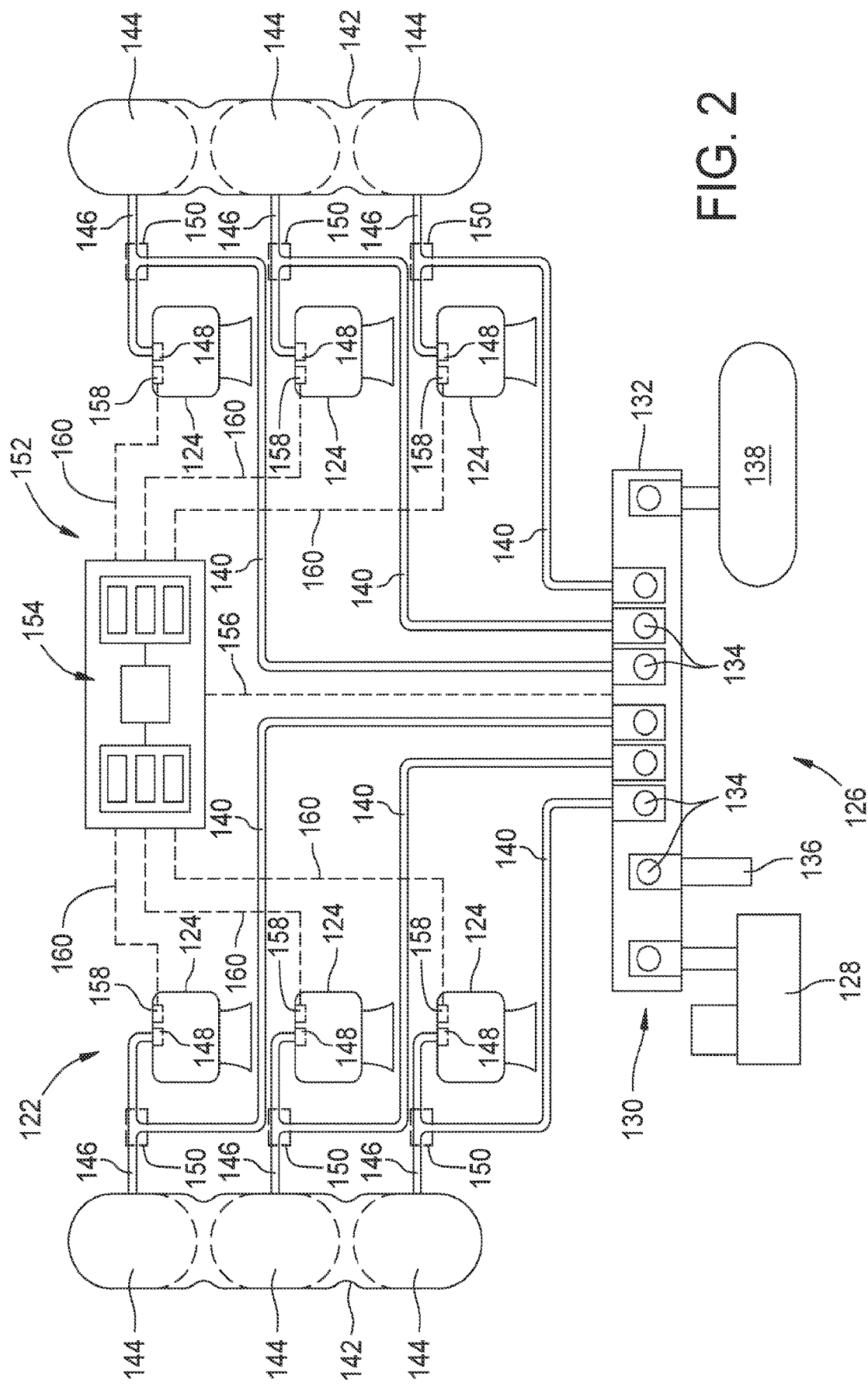
FIG. 2 is a greatly simplified schematic representation of one example of a suspension system in accordance with the subject matter of the present disclosure.
Figure 3:
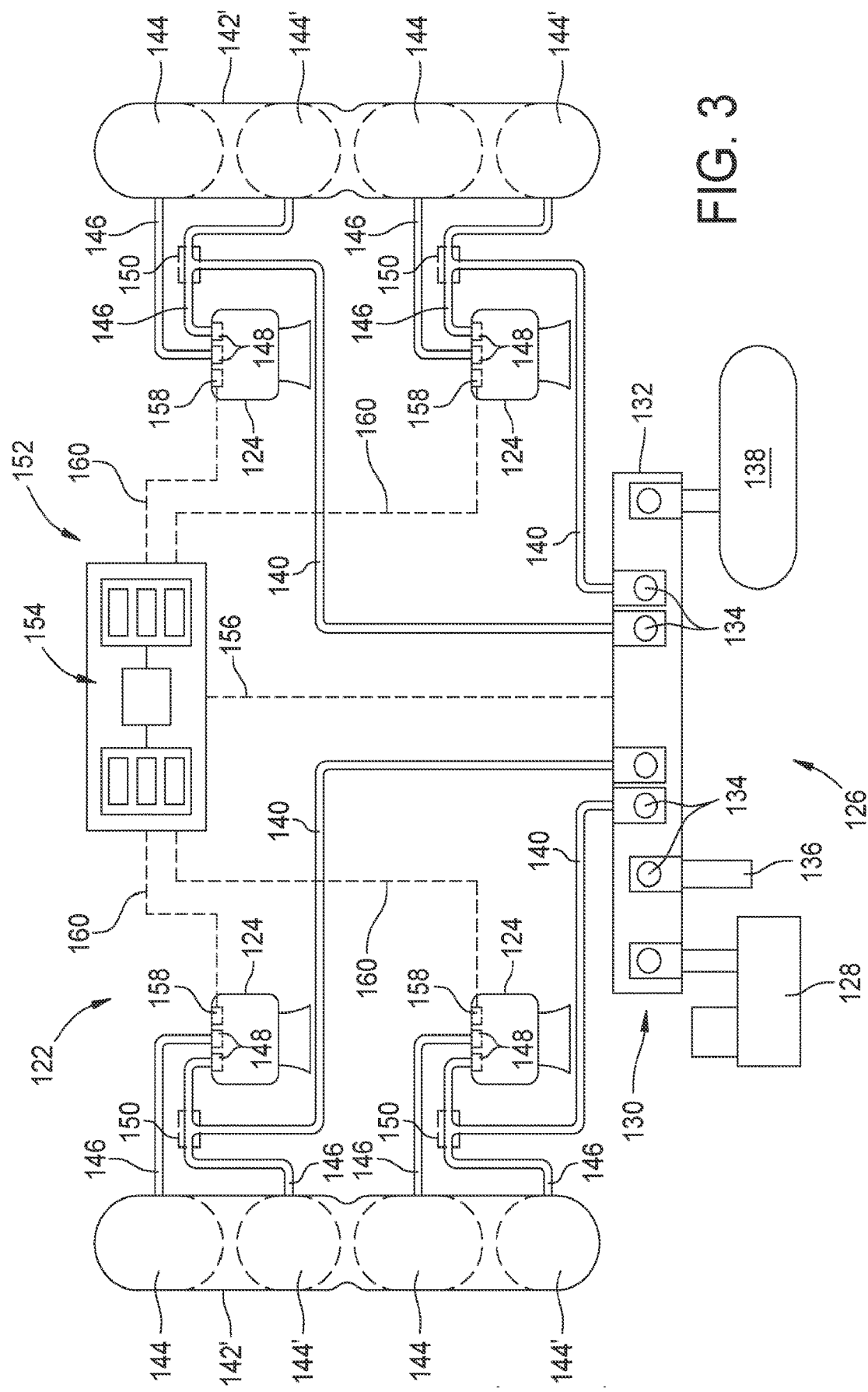
FIG. 3 is a greatly simplified schematic representation of another example of a suspension system in accordance with the subject matter of the present disclosure.
Figure 4:
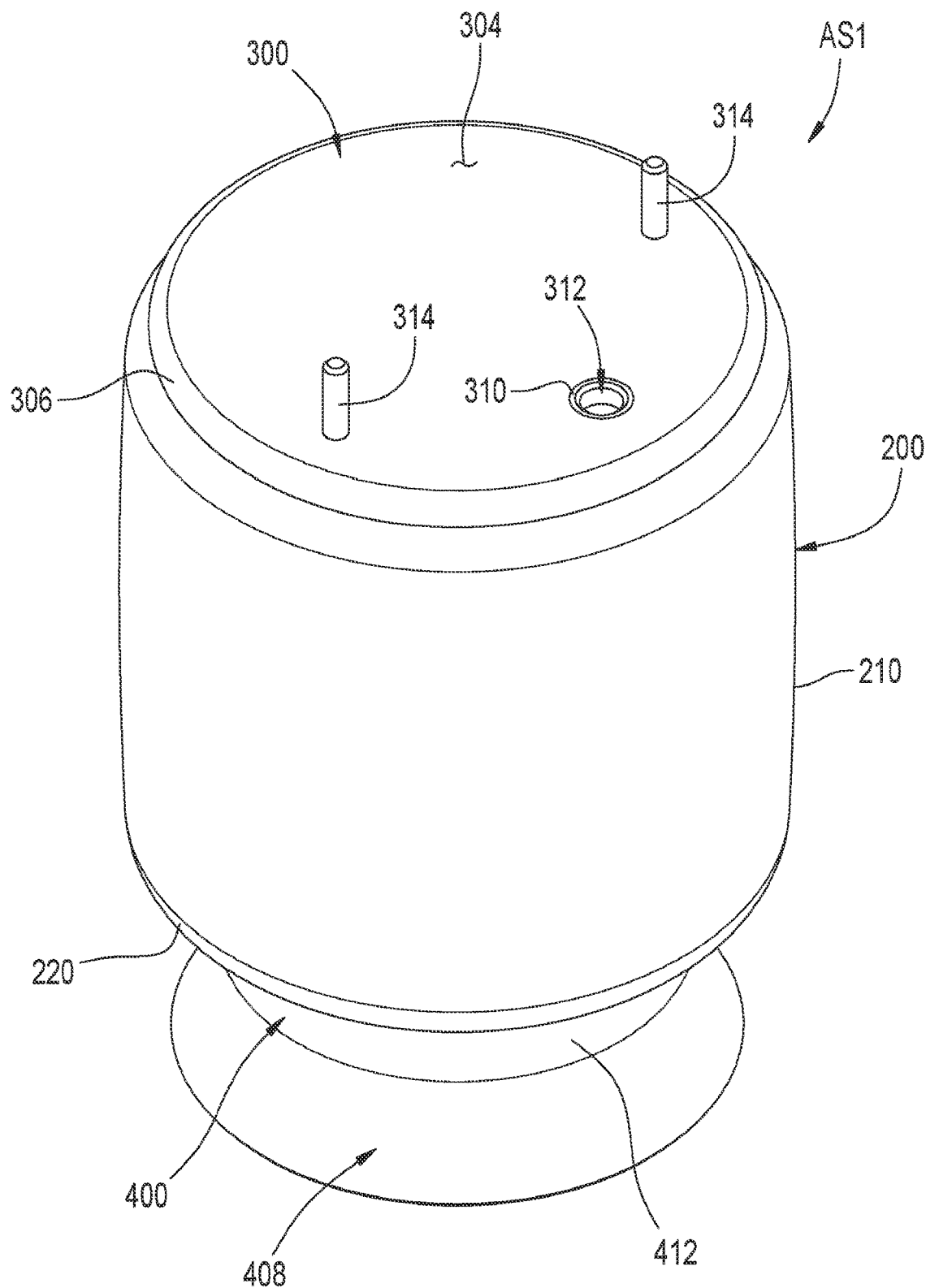
FIG. 4 is a top perspective view of one example of a gas spring and gas damper assembly in accordance with the subject matter of the present disclosure.
Figure 5:
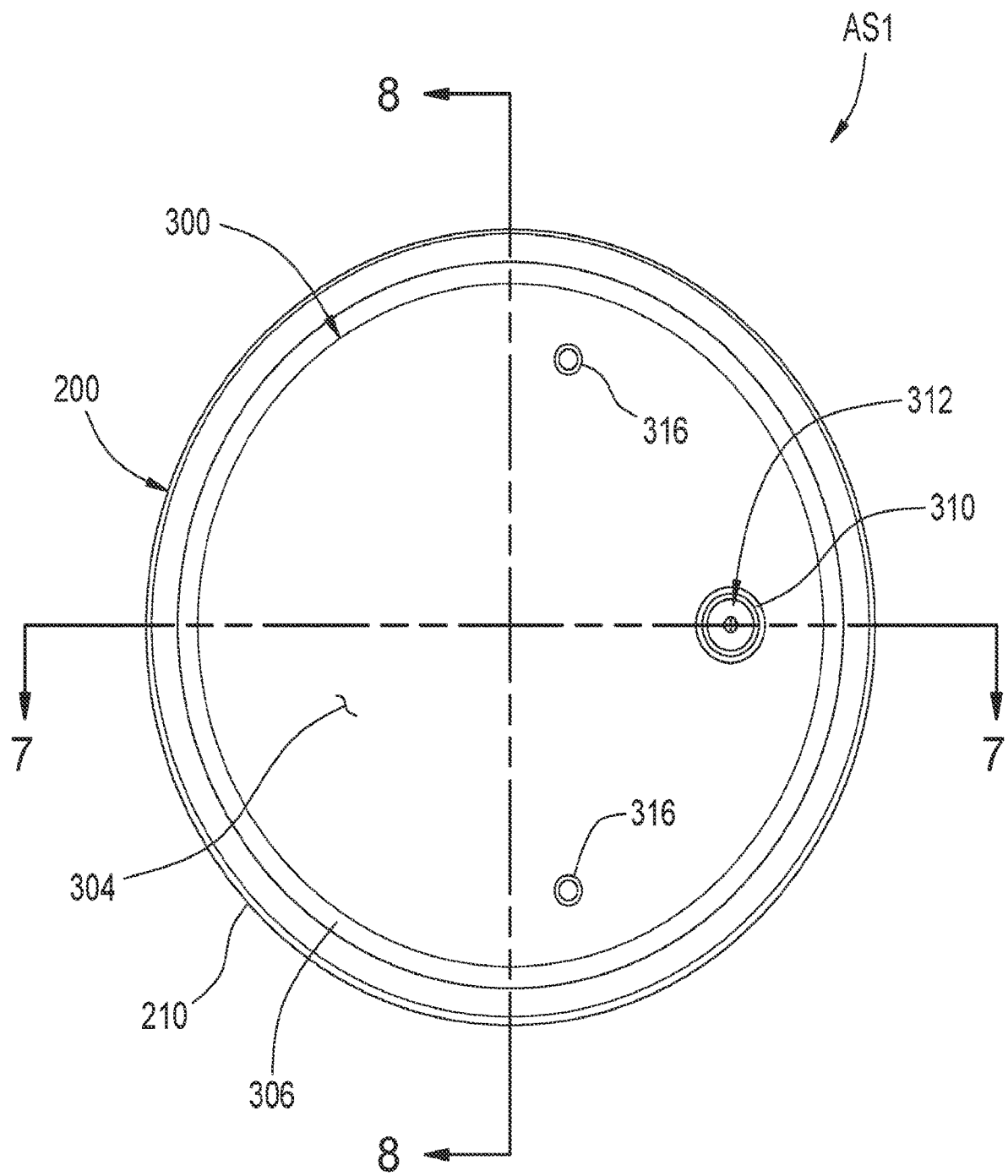
FIG. 5 is a top plan view of the exemplary gas spring and gas damper assembly in FIG. 4.

With reference to FIGS. 1-3, a vehicle 100 is shown as taking the form of a tractor-trailer combination that includes a tractor 102 and a trailer 104 that is operatively connected to the tractor for over-the-road transport. Tractor 102 is shown as including a frame 106 that is supported on a plurality of wheels 108 by a suspension system. Tractor 102 will typically also include an internal combustion engine (not shown) and drivetrain (not shown) that are supported on the frame and provide motive power to one or more of wheels 108. Tractor 102 can include a fuel tank 110 and an exhaust stack 112 that are operatively associated with the engine.

Tractor 102 can also include an operator compartment or cab 114 that can be supported on or along frame 106 in any suitable manner, such as by way of one or more cab mounts and/or one or more cab suspensions, for example. Additionally, or in the alternative, tractor 102 can, optionally, include a seat suspension located within the cab. It will be appreciated that a cab, such as cab 114, for example, will typically be supported on or along frame 106 by one or more of cab mounts, one or more cab suspensions and/or the seat will be supported within the cab by one or more seat suspensions. If included, such one or more cab suspensions and/or seat suspensions can include one or more gas spring assemblies and/or one or more dampers that can be operatively connected on or along frame 106 and a corresponding one of cab 114 and/or a seat within the cab in any suitable manner. Trailer 104 is shown as including a frame 116 that is supported on a plurality of wheels 118 by a suspension system. Trailer 104 can also include a trailer body 120 that is at least partially supported on frame 116 and is generally dimensioned to receive and retain a quantity of cargo.

FIGS. 1-3 identify a suspension system 122, which individually and/or collectively represents the various tractor, trailer, cab and seat suspensions discussed above. Suspension system 122 can include one or more gas spring assemblies 124 of any other type, kind and/or configuration, such as a rolling lobe-type construction, for example. Additionally, it will be appreciated that suspension system 122 can include one or more dampers that together with the one or more gas spring assemblies permit movement of the sprung and unsprung masses relative to one another in a somewhat controlled manner. Gas spring assemblies 124 and any dampers operatively associated therewith are operatively disposed between sprung and unsprung masses of vehicle 100, such as between frame 116 and axles and/or wheels 118 of trailer 104, for example.

Depending on desired performance characteristics and/or other factors, the one or more gas spring assemblies can, in some cases, be provided and installed separately from the one or more damper assemblies. Additionally, or in the alternative, a gas spring assembly can be assembled together with a damper assembly such that at least a portion of the gas spring assembly is axially coextensive with the damper assembly to form so-called gas spring and damper assemblies. In some cases, the dampers can be of a type and kind that utilizes pressurized gas as the working medium. Such pressurized gas or "air" dampers can be operatively associated with the gas spring assemblies, such as to form so-called gas spring and gas damper assemblies. Exemplary constructions of such so-called gas spring and gas damper assemblies are described hereinafter in additional detail. It will be appreciated that gas spring assemblies and components thereof in accordance with the subject matter of the present disclosure may be shown and described herein with particular reference to gas spring and gas damper assemblies. It is to be recognized and understood, however, that such constructions in suspension system 122 are optional and that gas spring assemblies in accordance with the subject matter of the present disclosure (as well as the components and assemblies thereof) are not intended to be limited to use in gas spring and damper assemblies and/or gas spring and gas damper assemblies unless specific reference thereto is otherwise set forth.

It will be appreciated that numerous components and/or systems of vehicle 100 can utilize pressurized gas (e.g., air) in connection with the operation thereof. As non-limiting examples, such components and/or systems can include a tractor suspension system, a tractor braking system, a cab suspension, a trailer suspension system and/or a trailer braking system. One greatly-simplified example of a pressurized gas system 126 that can be operatively associated with suspension system 122 and/or one or more other components and/or systems of vehicle 100 is shown in FIG. 2 with an additional (or alternate) example of the pressurized gas system shown in FIG. 3. As shown therein, components and devices in FIG. 3 that are additional, alternate or otherwise differ from components in FIG. 2 are identified in FIG. 3 with a prime ('). Pressurized gas system 126 can be operatively associated with one or more components and/or systems of the vehicle in any suitable manner for selectively supplying pressurized gas (e.g., air) thereto and selectively transferring pressurized gas therefrom.

In the exemplary arrangements shown in FIGS. 2 and 3, pressurized gas system 126 includes a pressurized gas source 128, such as a compressor, for example, for generating pressurized air or other gases. A control device 130, such as a valve assembly, for example, is shown as being in communication with pressurized gas source 128 and can be of any suitable configuration or arrangement. In the exemplary embodiment shown, control device 130 can include a valve assembly with a valve block 132 and a plurality of valves 134 supported thereon. Control device 130 can also, optionally, include a suitable exhaust 136, such as a muffler, for example, for venting pressurized gas from the system. Pressurized gas system 126 can also, optionally, include a reservoir 138, which is shown as being in fluid communication with the pressurized gas source and/or the control device, and is suitable for storing pressurized gas at an elevated pressure for an extended period of time, such as minutes, hours, days, weeks or months. In the arrangement shown in FIGS. 2 and 3, control device 130 is in communication with assemblies 124 through gas transfer lines 140. As such, pressurized gas can be selectively transferred into and/or out of the assemblies through control device 130, such as by selectively operating valves 134, for example.

In some cases, assemblies 124 can, optionally, include one or more components and/or other features operable to generate pressurized gas damping within the assemblies themselves. As an example, the assemblies can include two or more pressurized gas volumes internal to the gas spring and gas damper assemblies between which pressurized gas flows during operation and/or use to dissipate inputs, vibrations and/or other excitations acting on the gas spring and gas damper assemblies, such as is described hereinafter in connection with FIGS. 4-13, for example. Additionally, or in the alternative, assemblies 124 can be operatively associated with one or more pressurized gas volumes that are external to the assemblies. In which cases, the external pressurized gas volumes can be disposed in fluid communication with one or more of the gas spring and gas damper assemblies in a suitable manner, such as by way of one or more external gas transfer lines, for example.

As a non-limiting example, pressurized gas system 126 is shown in FIGS. 1 and 2 as including external containers 142 that include a plurality of discrete damper volumes 144 within one of external containers 142. As another non-limiting example, pressurized gas system 126 is shown in FIGS. 1 and 3 as including a plurality of external containers 142' that include a plurality of damper volumes 144 as well as a plurality of discrete damper volumes 144'. Damper volumes 144 are shown as having an approximately common size and shape with one of damper volumes 144 disposed in fluid communication with a respective one of assemblies 124. Whereas, damper volumes 144' are shown as having a different size and/or shape with one damper volume of each size disposed in fluid communication with a respective one of the gas spring and gas damper assemblies in FIG. 3. It will be appreciated that any configuration and/or combination of volumes 144 and/or 144' can be used. Where two different size damper volumes are used, it is expected that the suspension system will be operable to damp or dissipate inputs, vibrations and/or other excitations acting on the gas spring and gas damper assemblies within two or more different targeted or otherwise predetermined ranges of frequencies of vibration, such as within a range of from approximately 0.5-2 Hz and a range of from approximately 6-14 Hz, for example.

It will be recognized and appreciated that any suitable number of two or more discrete damper volumes can be included within each external container. Damper volumes 144 are fluidically isolated from one another within each of external containers 142 such that the mounting or other installation of a single external container provides a discrete damper volume for use by each of a plurality of gas spring and gas damper assemblies. As shown in FIG. 2, assemblies 124 are each disposed in fluid communication with one of damper volumes 144 through a gas transfer line 146 such that pressurized gas into, out of and/or otherwise between respective ones of assemblies 124 and damper volumes 144 during operation and/or use of suspension system 120 to dissipate inputs, vibrations and/or other excitations acting on vehicle 100, such as one or along tractor 102 and/or trailer 104, for example.

In some cases, suspension system 122 can include passive flow devices 148 disposed in fluid communication on, along or otherwise between assemblies 124 and damper volumes 144, such as is shown in FIGS. 2 and 3, for example. Passive flow devices 148 can include an orifice or throttle element operable to tune or assist in tuning the suspension system to damp or dissipate inputs, vibrations and/or other excitations acting on the gas spring and gas damper assemblies, particularly those within a targeted or otherwise predetermined range of frequencies of vibration, such as within a range of from approximately 0.5-2 Hz and/or a range of from approximately 6-14 Hz, for example. It will be appreciated that the passive flow devices can be fluidically connected in fluid communication on, along or otherwise between one of assemblies 124 and a respective one of damper volumes 144 in any suitable manner. As one non-limiting example, passive flow devices 148 can be mounted within assemblies 124, such as on or along an end member thereof, for example.

In some cases, gas transfer lines 140 can be fluidically connected with a corresponding one of gas transfer lines 146 such that pressurized gas can be selectively transferred into and/or out of the assemblies through control device 130. In some cases, one or more control devices, such as check valves, pressure retention valves and/or pressure release valves, for example, can be disposed in fluid communication on, along or otherwise between gas transfer lines 140 and/or 146, such as are represented in FIG. 2 by boxes 150.

As indicated above, it will be appreciated that pressurized gas system 126 is greatly simplified and merely illustrates one example of a pressurized gas system with which gas spring and gas damper assemblies in accordance with the subject matter of the present disclosure can be used. As such, it will be appreciated that the pressurized gas system can include any one or more additional systems and/or components. For example, in some cases, pressurized gas system 126 can include a control system 152 that is capable of communication with any one or more systems and/or components of vehicle 100, such as for selective operation and/or control thereof. Control system 152 can include a controller or electronic control unit (ECU) 154 communicatively coupled with pressurized gas source 128 and/or control device 130, such as through a conductor or lead 156, for example, for selective operation and control thereof, which can include supplying and exhausting pressurized gas to and/or from the assemblies 124 of suspension systems 118 and/or 132, respectively. It will be appreciated that controller 158 can be of any suitable type, kind and/or configuration.

Control system 152 can also, optionally, include one or more sensors 158, such as, for example, may be operatively associated with the assemblies and capable of outputting or otherwise generating data, signals and/or other communications having a relation to one or more of: a height of one or more of the assemblies; a distance between other components of the vehicle; a pressure or temperature having a relation to one or more of the assemblies and/or a wheel or tire or other component associated with one or more of the assemblies; and/or an acceleration, load or other input acting on one or more of the assemblies. Sensors 158 can be in communication with ECU 154, which can receive the data, signals and/or other communications therefrom. The sensors can be in communication with ECU 154 in any suitable manner, such as through conductors or leads 160, for example. Additionally, it will be appreciated that the sensing devices can be of any suitable type, kind and/or construction and can operate using any suitable combination of one or more operating principles and/or techniques.

Having described an example of a suspension system (e.g., suspension system 122) that can include gas spring and gas damper assemblies in accordance with the subject matter of the present disclosure (e.g., assemblies 124), one example of such a gas spring and gas damper assembly will now be described in connection with FIGS. 4-13. As shown therein, a gas spring and gas damper assembly AS1, such as may be suitable for use as one or more of assemblies 124 in FIGS. 1-3, for example, is shown as having a longitudinal axis AX and including a flexible spring member 200. Gas spring and gas damper assembly AS1 also includes an end member (or end member assembly) 300 that is secured on or along the flexible spring member such that a substantially fluid-tight connection is formed therebetween. The gas spring and gas damper assembly also includes an end member (or end member assembly) 400 that is operatively connected to flexible spring member 200 by way of an end closure assembly 500. Flexible spring member 200 can be secured one or along end members in a substantially fluid-tight manner such that a spring chamber 202 (FIGS. 7 and 8) is at least partially defined by the flexible spring member between end member 300, end member assembly 400, and/or end closure assembly 500.

It will be appreciated that flexible spring member 200 can be of any suitable size, shape, construction and/or configuration. Additionally, the flexible spring member can be of any type and/or kind, such as a rolling lobe-type or convoluted bellows-type construction, for example. Flexible spring member 200 is shown in FIGS. 4-8 as including a flexible wall 204 that can be formed in any suitable manner and from any suitable material or combination of materials. For example, the flexible wall can include one or more fabric-reinforced, elastomeric plies or layers and/or one or more un-reinforced, elastomeric plies or layers. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 204 can extend in a generally longitudinal direction between opposing ends 206 and 208. Additionally, flexible wall 204 can include an outer surface 210 and an inner surface 212. The inner surface can at least partially define spring chamber 202 of gas spring and gas damper assembly AS1. Flexible wall 204 can include an outer or cover ply (not identified) that at least partially forms outer surface 210, can also include an inner or liner ply (not identified) that at least partially forms inner surface 212. In some cases, flexible wall 204 can further include one or more reinforcing plies (not shown) disposed between outer and inner surfaces 210 and 212. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 200 can include any feature or combination of features suitable for forming a substantially fluid-tight connection with end member 300 and/or end member assembly 400. As one example, flexible spring member 200 can include a mounting bead 214 disposed along end 206 of flexible wall 204 and a mounting bead 216 disposed along end 208 of the flexible wall. In some cases, the mounting beads, if provided, can, optionally, include a reinforcing element, such as an endless, annular bead wire 218, for example.

It will be appreciated that the end members can be of any suitable type, kind, construction and/or configuration, and can be operatively connected or otherwise secured to the flexible spring member in any suitable manner. In the exemplary arrangement shown in FIGS. 4-8, for example, end member 300 is of a type commonly referred to as a bead plate and includes an end member wall 302 with a mounting wall portion 304 and an outer peripheral wall portion 306. End member 300 is disposed along end 206 of flexible wall 204 with outer peripheral wall portion 306 crimped or otherwise deformed around at least a portion of mounting bead 214 such that a substantially fluid-tight seal can be formed between flexible spring member 200 and end member 300. Mounting wall portion 304 can have an approximately planar outer surface portion 308 dimensioned to abuttingly engage an associated structural component (e.g., upper structural component USC).

Mounting wall portion 304 can at least partially define one or more passages or openings 310 extending through end member 300, such as may be suitable for operatively connecting a pressurized gas line in fluid communication with assembly AS1 as is shown in FIGS. 2 and 3, for example. In some cases, end member 300 can include one or more passive flow devices 312 disposed in fluid communication with openings 310. Passive flow devices 312 can include an orifice or throttle passage with a non-cylindrical cross-sectional profile that is operable to tune or assist in tuning the suspension system to damp or dissipate inputs, vibrations and/or other excitations acting on the gas spring and gas damper assemblies, particularly those within a targeted or otherwise predetermined range of frequencies of vibration, such as within a range of from approximately 0.5-2 Hz and/or a range of from approximately 6-14 Hz, for example.

Figure 6:
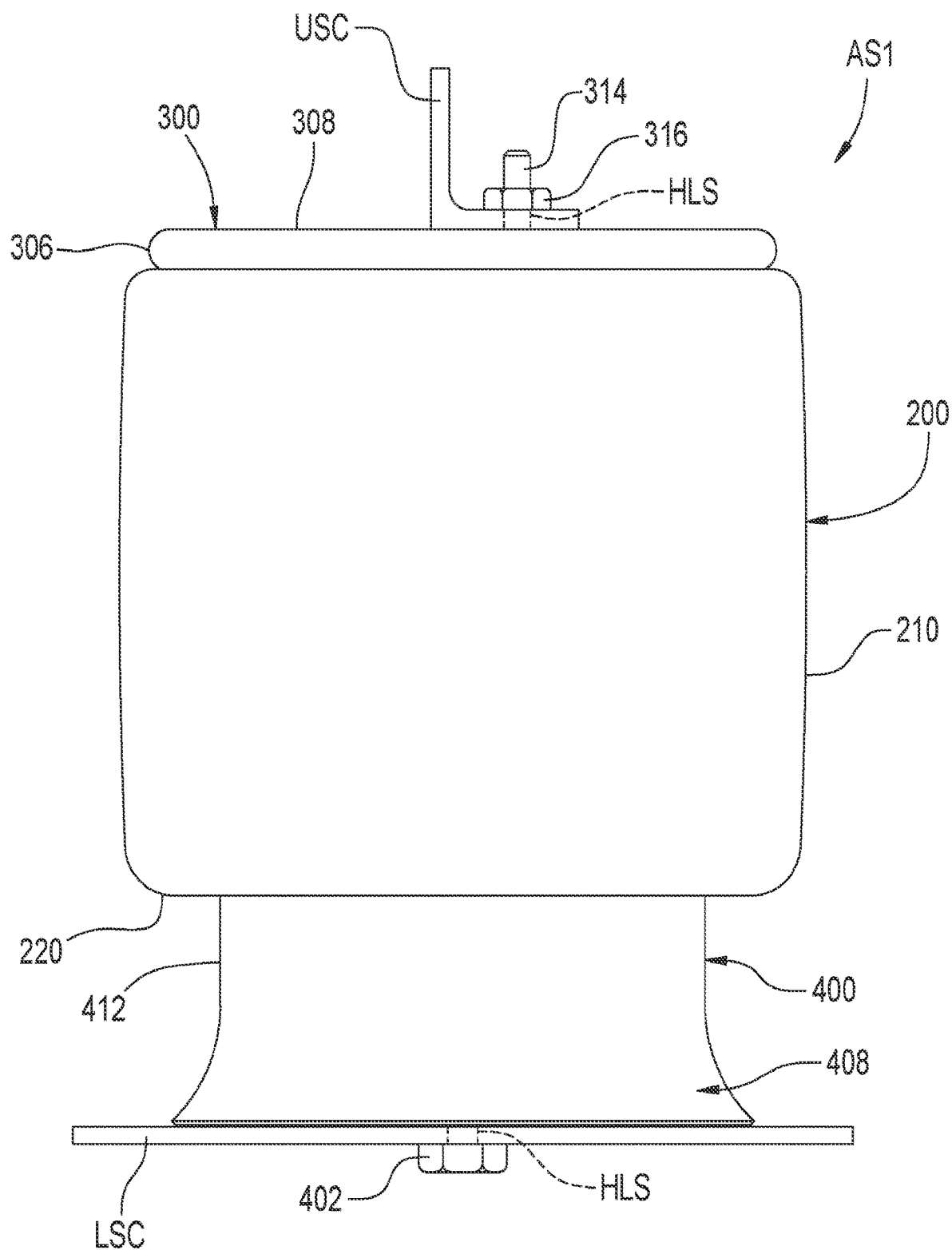
FIG. 6 is a side elevation view of the exemplary gas spring and gas damper assembly in FIGS. 4 and 5.
Figure 7:
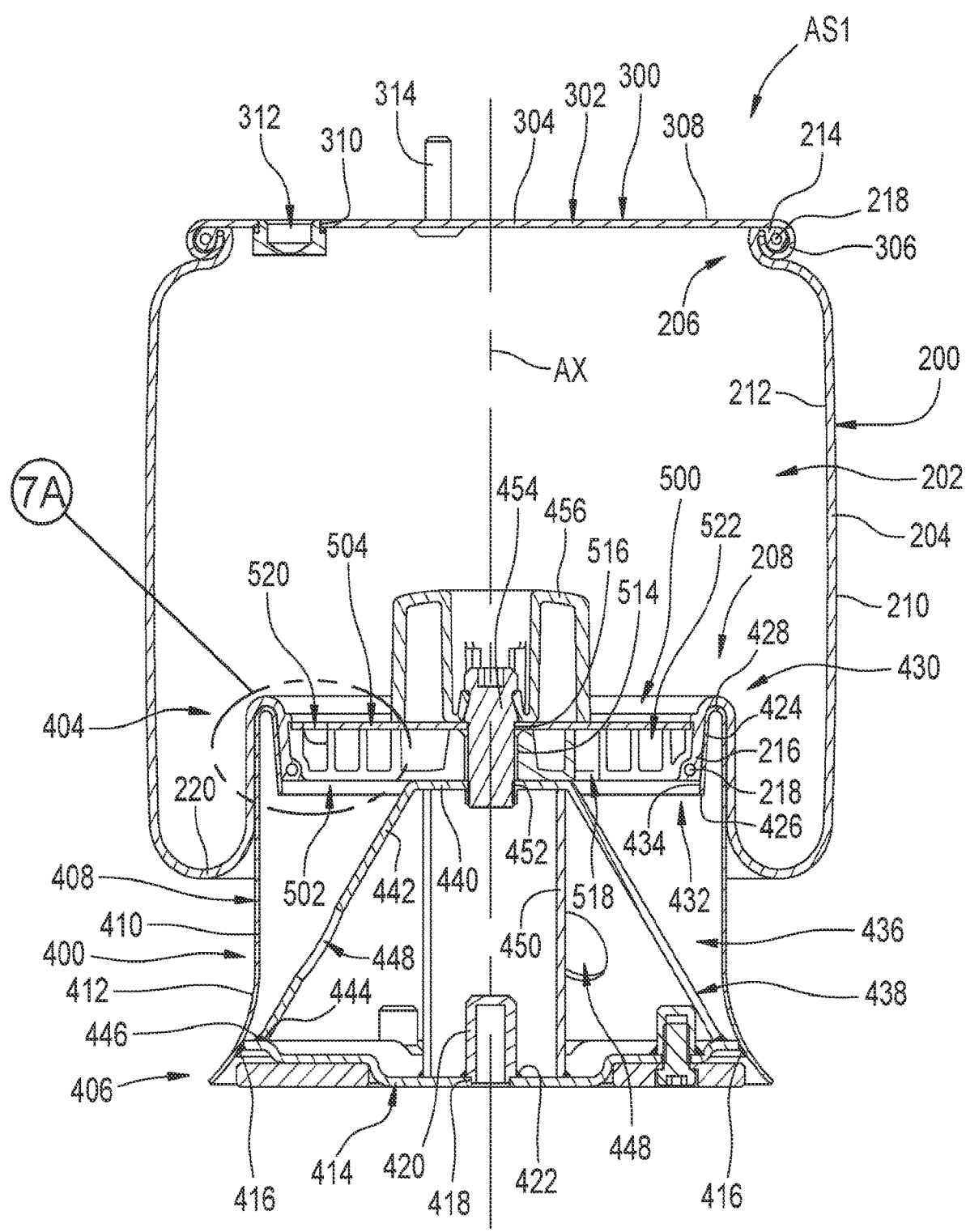
FIG. 7 is a cross-sectional side view of the exemplary gas spring and gas damper assembly in FIGS. 4-6 taken from along line 7-7 in FIG. 5.
Figure 7A:
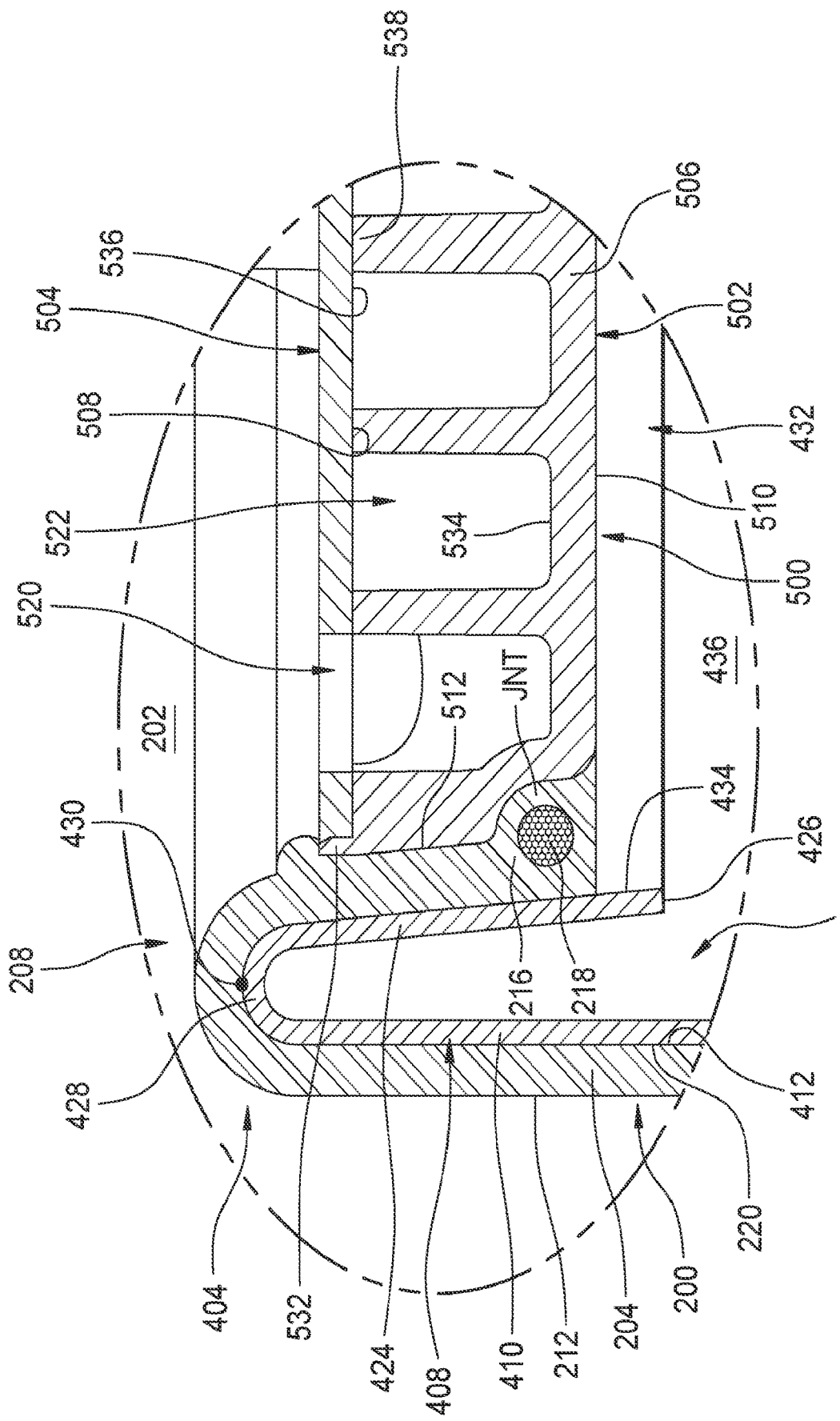
FIG. 7A is an enlarged view of the portion of the exemplary gas spring and gas damper assembly identified in Detail 7A in FIG. 7.
Figure 8:
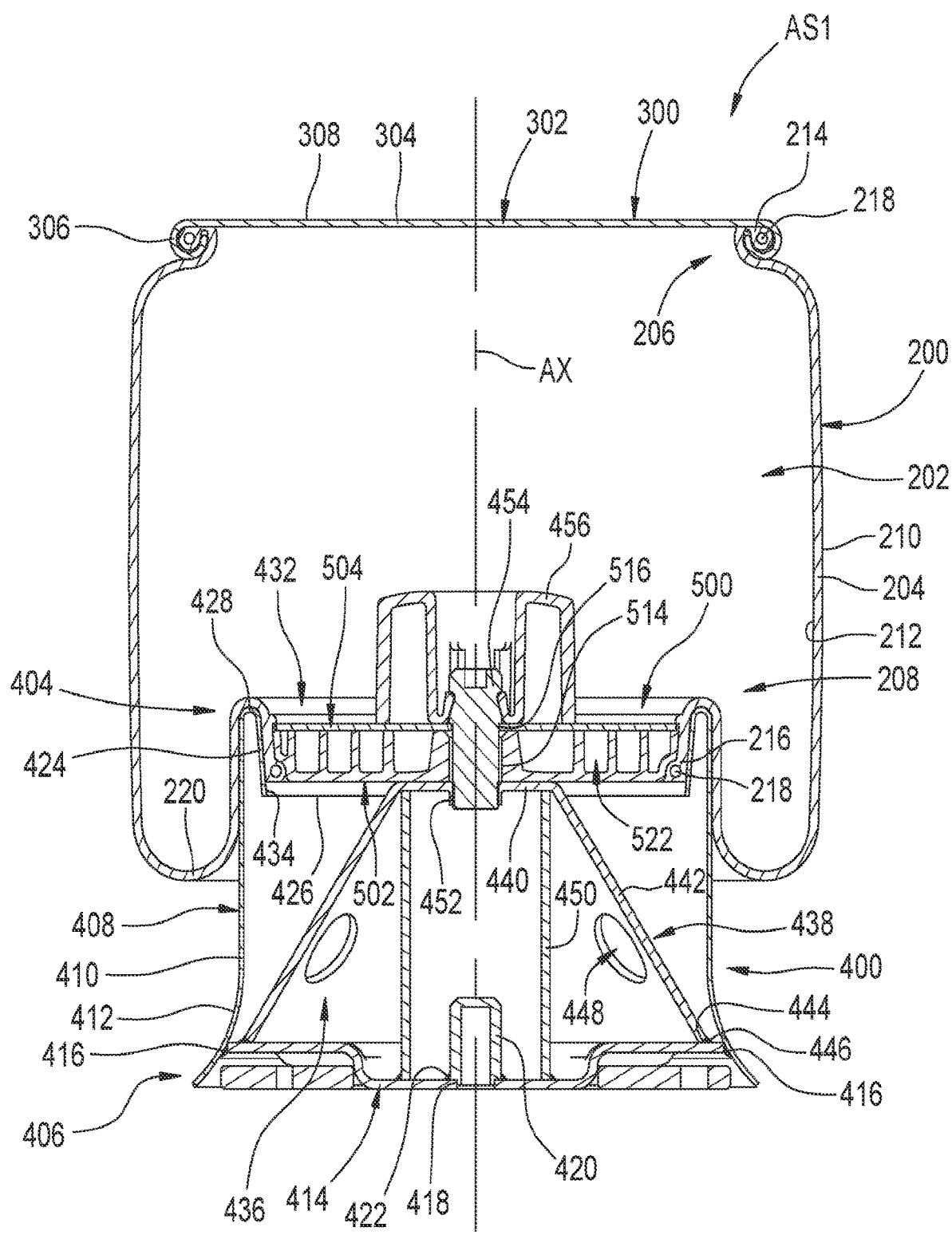
FIG. 8 is a cross-sectional side view of the exemplary gas spring and gas damper assembly in FIGS. 4-7 taken from along line 8-8 in FIG. 5.
Figure 9:
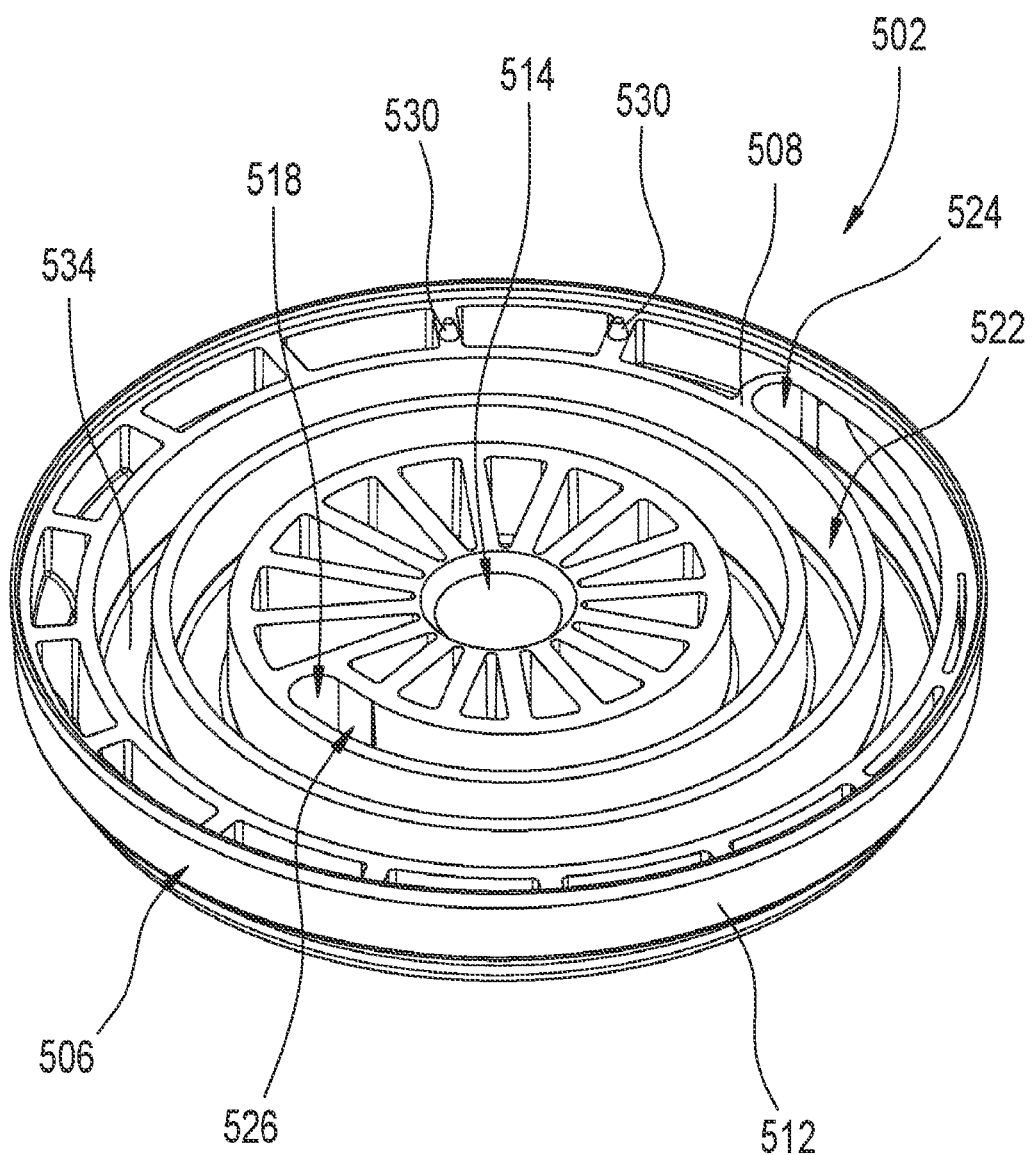
FIG. 9 is a top perspective view of one example of an end closure body in accordance with the subject matter of the present disclosure, such as is shown in use in connection with the exemplary gas spring and gas damper assembly in FIGS. 4-8.
Figure 10:
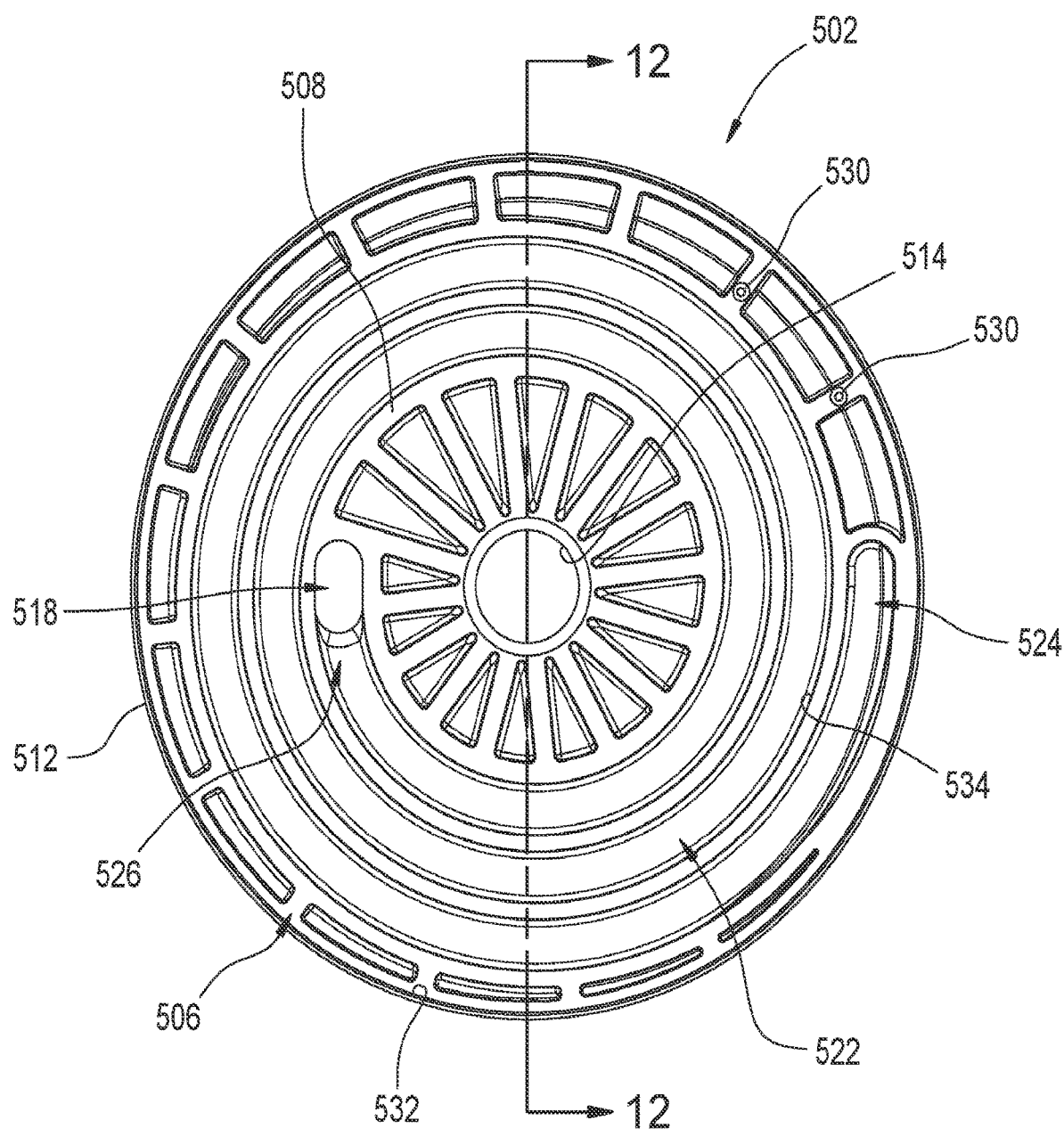
FIG. 10 is a top plan view of the exemplary end closure body in FIGS. 7-9.

Gas spring and gas damper assembly AS1 can be disposed between associated sprung and unsprung masses of an associated vehicle in any suitable manner. For example, one end member can be operatively connected to the associated sprung mass with the other end member disposed toward and operatively connected to the associated unsprung mass. As shown in FIG. 6, for example, end member 300 can be secured on or along a first or upper structural component USC, such as trailer body 120 in FIG. 1, for example, and can be secured thereon in any suitable manner. For example, one or more securement devices, such as mounting studs 314, for example, can be included along end member 300. In some cases, the one or more securement devices (e.g., mounting studs 314) can project outwardly from mounting wall portion 304 of end member 300 and can be secured thereon in a suitable manner, such as, for example, by way of a flowed-material joint (not shown) or a press-fit connection (not identified). Additionally, such one or more securement devices can extend through mounting holes HLS in upper structural component USC and can receive one or more threaded nuts 316 or other securement devices, for example. As an alternative to one or more of mounting studs 314, one or more threaded passages (e.g., blind passages and/or through passages) could be used in conjunction with a corresponding number of one or more threaded fasteners.

End member assembly 400 can be secured on or along a second or lower structural component LSC, such as axles and/or wheels 118 in FIG. 1, for example, in any suitable manner. As one example, lower structural component LSC could include one or more mounting holes HLS extending therethrough. In such case, a threaded fastener 402 (FIG. 6) could extend through one of mounting holes HLS and threadably engage end member assembly 400 to secure the end member assembly on or along the lower structural component. It will be appreciated, however, that other configurations and/or arrangements could alternately be used.

End member assembly 400 is shown as including features associated with a type of end member commonly referred to as a piston (or a roll-off piston). It will be recognized that a wide variety of sizes, shapes, profiles and/or configurations can and have been used in forming end members of the type and kind referred to as pistons or roll-off pistons, such as end member assembly 400, for example. As such, it will be appreciated that the walls and/or wall portions of the end member can be of any suitable shape, profile and/or configuration, such as may be useful to provide one or more desired performance characteristics, for example, and that the profile shown in FIGS. 4-8 is merely exemplary.

End member assembly 400 extends longitudinally between an end 404 and an end 406. End 404 is adapted to receivingly engage end 208 of flexible spring member 200 with end 406 of end member assembly 400 adapted to abuttingly engage an associated structural component, such as has been described above in connection with lower structural component LSC, for example.

End member assembly 400 includes an end member body or shell 408 and can also, optionally, include one or more additional components and/or elements. End member body 408 has a first or outer side wall portion 410 that extends generally longitudinally between first and second ends 404 and 406. In an assembled condition and during use, a portion of flexible spring member 200 forms a rolling lobe 220 that is displaced along an outer surface portion 412 of outer side wall portion 410 as the gas spring and gas damper assembly undergoes changes in overall height, such as, for example, may be due to variations in load conditions applied thereto, as is well understood by those of skill in the art.

End member assembly 400 can also include an end member base 414 that is secured on or along end member shell 408 toward end 406 of end member assembly 400. End member base 414 can be secured on or along end member shell 408 in any suitable manner, such as, for example, by welding the end member base and the end member shell together, as indicated by flowed-material joint 416, for example. A mounting hole 418 can, optionally, extend through end member base 414 and a threaded insert 420 can be secured on end member base 414 along mounting hole 418 in a suitable manner, such as by a flowed-material joint 422, for example.

Outer side wall portion 410 of end member shell 408 extends generally longitudinally between ends 404 and 406. End member shell 408 also includes an inner side wall portion 424 that is disposed radially inward of outer side wall portion 410 and terminates at a distal edge 426. An intermediate wall portion 428 extends between and interconnects outer side wall portion 410 with inner side wall portion 424 opposite distal edge 426 thereof. The intermediate wall portion can have an inverted and somewhat U-shaped cross-sectional profile that forms a distal extent 430 of end member shell 408 along end 404 of the end member having an open end 432. Inner side wall portion 424 is disposed at an acute angle relative to longitudinal axis AX such that the inner side wall portion of end member shell 408 has an inner surface portion 434 with a frustoconical shape or configuration.

End member shell 408 and end member base 414 together at least partially define an end member chamber 436 within end member assembly 400. In some cases, an inner support wall 438 can, optionally, be disposed within end member chamber 436 and supported on or along one or more of end member shell 408 and/or end member base 414. If included, inner support wall 438 can include an end wall portion 440 oriented transverse to longitudinal axis AX and disposed toward end 404 of the end member. Inner support wall 438 can also include an extension wall portion 442 that extends from along end wall portion 440 toward a distal edge 444 disposed along end member shell 408 and/or end member base 414. In some cases, extension wall portion 442, if provided, can be secured on or along end member shell 408 and/or end member base 414 in a suitable manner, such as by way of one or more flowed-material joints 446. One or more passages and/or openings 448 can be included on or along extension wall portion 442 to permit the portions of end member chamber 436 inside and outside of inner support wall 438 to be in fluid communication with one another, such as to permit the portions inside and outside of inner support wall 438 to fluidically operate as a substantially-contiguous volume. In some cases, a support column wall 450 can, optionally, extend from along end member base 414 to end wall portion 438 of inner support wall 436, such as to assist in carrying forces and/or loads from end wall portion 440 to end member base 414, for example.

As mentioned above, the end member can be secured on or along an associated structural component, such as lower structural component LSC, for example, in any suitable manner and through the use of any suitable combination of components. Similarly, end closure assembly 500 can be secured on or along end member assembly 400 in any suitable manner and through the use of any suitable combination of components. For example, a mounting hole 452 can, optionally, extend through end wall portion 438. In such case, a bumper mount 454 can extend through end closure assembly 500 and into engagement with mounting hole 452. Bumper mount 454 can be threadably engaged with end wall portion 438 such that end closure assembly 500 and a portion of flexible spring member 200 (e.g., mounting bead 216) can be secured in a substantially fluid-tight arrangement with inner surface portion 434 of inner side wall portion 424 of end member shell 408. In a preferred arrangement, a portion of bumper mount 454 will extend axially outwardly beyond end closure assembly 500 and project into spring chamber 202. In such case, a jounce bumper 456 of any suitable type, kind, construction and/or configuration can be received on bumper mount 454 and/or otherwise secured within spring chamber 202 of gas spring and gas damper assembly AS1.

End member chamber 436 can be disposed in fluid communication with spring chamber 202 such that gas transfer between the spring chamber and the end member chamber can generate pressurized gas damping during extension and/or compression of a gas spring and gas damper assembly in accordance with the subject matter of the present disclosure (e.g., gas spring and gas damper assembly AS1) as the same undergoes dynamic use in operation. As discussed above, end member shell 408 includes an open end 432 at least partially defined by inner surface portion 434 of inner side wall portion 424 and across which spring chamber 202 and end member chamber 330 can fluidically communicate with one another through end closure assembly 500, as discussed in greater detail hereinafter.

With reference, now, to FIGS. 7, 7A and 8-13, end closure assembly 500 is shown as including an end closure body 502 and a cover plate 504 that is operatively secured on or along the end closure body, such as by way of a press-fit connection, for example. End closure body 502 includes an end closure wall 506 that extends around and radially outward from axis AX in transverse relation thereto. End closure wall 506 includes a surface portion 508 disposed along one side of end closure body 502 and a surface portion 510 disposed along another side of end closure body 502. In a preferred arrangement, surface portion 508 can be approximately planar and/or otherwise dimensioned to abuttingly engage cover plate 504. Surface portion 510 can be disposed toward and dimensioned to abuttingly engage end wall portion 440 of inner support wall 438 of end member assembly 400. End closure wall 506 also includes an outer peripheral surface portion 512 that faces radially outward and extends axially between surface portions 508 and 510. In some cases, end closure wall 506 can include or otherwise at least partially define a bead seat 512' that can extend annularly around end closure body 502 and be dimensioned to at least partially receive or otherwise abuttingly engage mounting bead 216 and/or bead wire 218 of flexible spring member 200.

Figure 11:
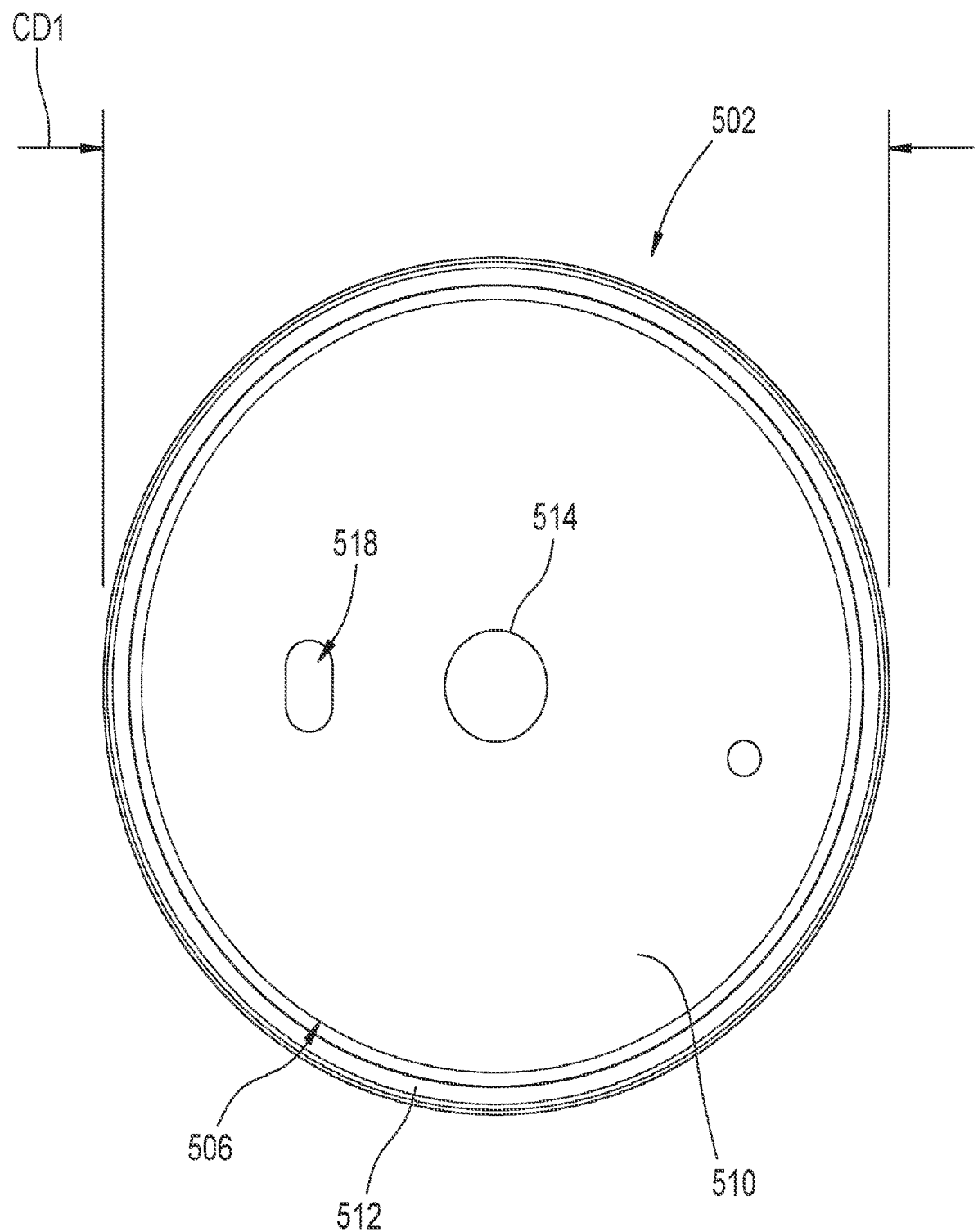
FIG. 11 is a bottom plan view of the exemplary end closure body in FIGS. 7-10.
Figure 12:
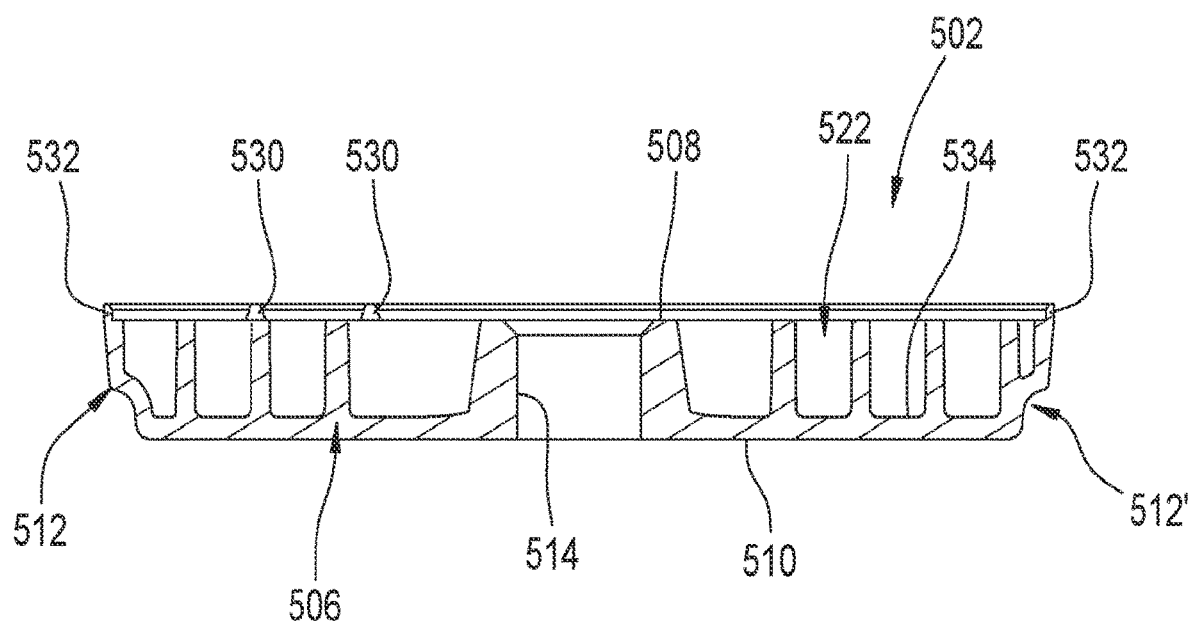
FIG. 12 is a cross-sectional side view of the exemplary end closure body in FIGS. 7-11 taken from along line 12-12 in FIG. 10.
Figure 13:
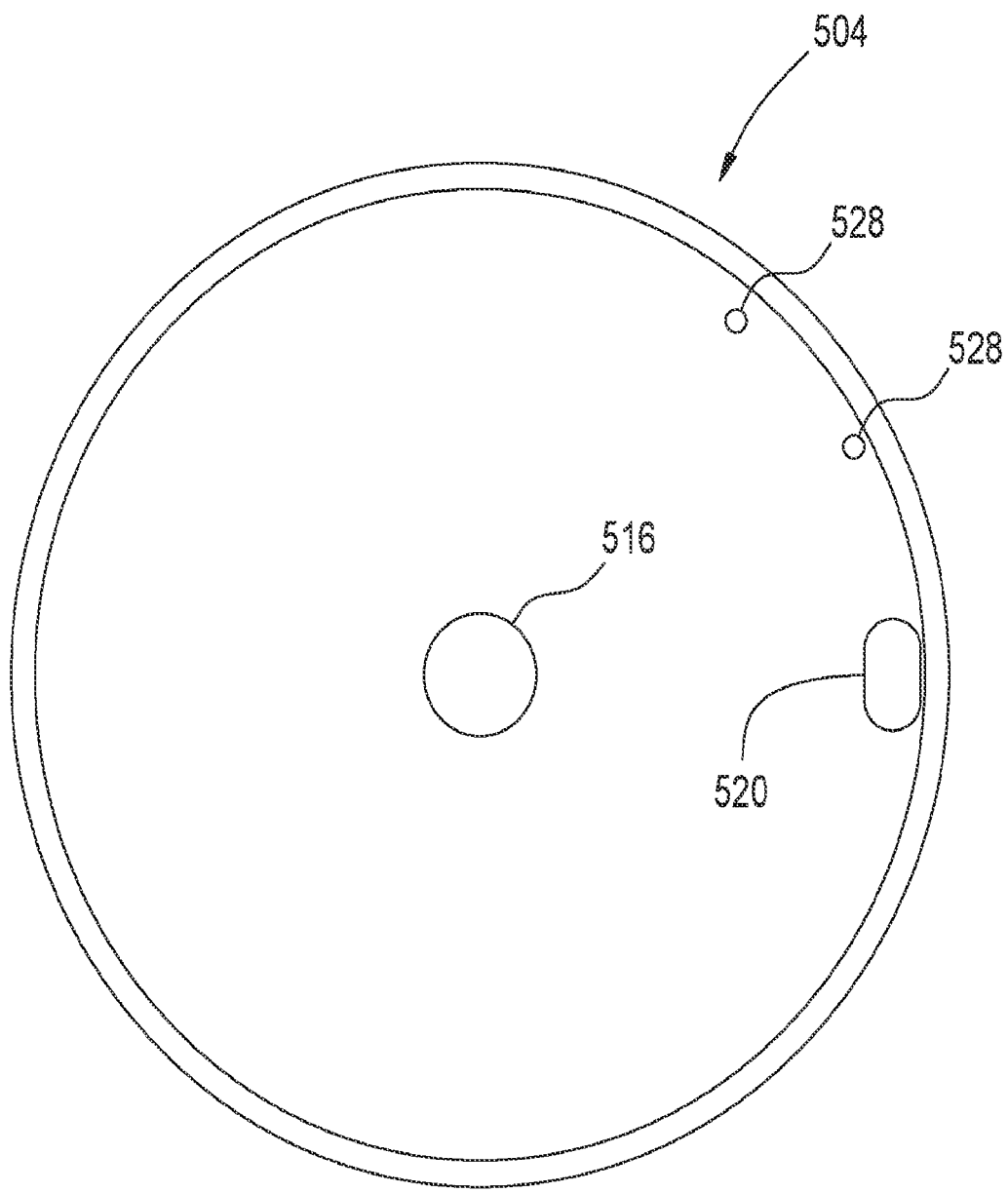
FIG. 13 is a bottom plan view of one example of a cover plate in accordance with the subject matter of the present disclosure, such as is shown in use in connection with the end closure body in FIGS. 7-12.

It will be appreciated that outer peripheral surface portion 512 can be of any suitable size, shape and/or configuration. For example, the outer peripheral surface portion can have a cross-sectional profile with any suitable number of linear and/or curved profile segments. Regardless of the shape and/or configuration of end closure body 502 and outer peripheral surface portion 512 thereof, it will be appreciated that end closure assembly 500 will, in an assembled condition, have an outermost cross-sectional dimension (e.g., a diameter) that extends generally thereacross, such as is represented in FIG. 11 by reference dimension CD1, for example. Additionally, end closure assembly 500 is operatively engaged with a portion (e.g., mounting bead 216) of flexible spring member 200, such as on or along outer peripheral surface portion 512, for example.

In a preferred construction, a substantially fluid-tight joint is formed between the flexible spring member and at least the end closure body thereby establishing a flexible spring member and end closure assembly FEA that is separate from end member 300 and separate from end member assembly

400. It will be appreciated that the substantially fluid-tight joint between flexible spring member 200 and end closure body 502 can be at least partially formed in any suitable manner. In some cases, such a substantially fluid-tight joint can be formed through the use of an adhesive and/or sealing material. In other cases, mounting bead 216 can be permanently secured or otherwise attached to one or more components of end closure assembly 500, such as along at least outer peripheral surface portion 512 of end closure body 502, for example. For example, a portion (e.g., mounting bead 216) of flexible spring member 200 can be adhered, vulcanized, cured or otherwise permanently attached (i.e., inseparable without damage, destruction or material alteration of at least one of the constituent materials and/or component parts) to end closure assembly 500 or a surface portion thereof (e.g., outer peripheral surface portion 512), which substantially fluid-tight connections are collectively represented in FIG. 7A by dashed lines JNT.

As discussed above, end closure assembly 500 can be secured on or along end member assembly 400 in any manner suitable for urging a portion (e.g., mounting bead 216) of flexible spring member 200 into abutting engagement with inner side wall portion 424 of end member assembly 400. As one example, bumper mount 454 can be used to secure the end closure assembly on end member assembly 400, as discussed above. In such case, end closure wall 506 can include a hole or passage 514 extending through end closure body 502. Cover plate 504 can also include a hole or passage 516 extending therethrough that is cooperative with hole 514. In this manner, cover plate 504 can be positioned across surface portion 508 of end closure body 502 with holes 514 and 516 forming a passage through end closure assembly 500. In an assembled condition, at least a portion of bumper mount 454 can extend through holes 514 and 516 and engage end wall portion 438 or another similar feature and thereby secure end closure assembly 500 and end 208 of flexible spring member 200 on or along end member assembly 400. In some cases, a surface or shoulder (not numbered) of bumper mount 454 can abuttingly engage cover plate 504, such as may urge the cover plate and/or the end closure body into engagement with end wall portion 440 of inner support wall 438.

In accordance with the subject matter of the present disclosure, a gas spring and gas damper assembly includes one or more elongated gas damping passages fluidically connected between the spring chamber and one or more end member chambers of the gas spring and gas damper assembly (e.g., end member chamber 436). Generally, the one or more elongated gas damping passages can be dimensioned such that pressurized gas flows into, out of and/or otherwise is displaced within the elongated gas damping passage or passages. As a result, such pressurized gas flow can generate pressurized gas damping of vibrations and/or other dynamic inputs acting on the overall assembly and/or system. Differential pressure between the spring chamber and the one or more end member chambers induces gas flow along at least a portion of the length of the elongated gas damping passage. It will be appreciated that such movement of the pressurized gas within and/or through an elongated gas damping passage can act to dissipate kinetic energy acting on the assembly and/or system. In a preferred arrangement, such pressurized gas damping can be configured for or otherwise targeted to dissipate vibrations and/or other dynamic inputs having a particular, predetermined natural frequency or within a particular, predetermine range of frequencies.

It will be appreciated that the cross-sectional area and overall length of the elongated gas damping passage can be dimensioned, sized and/or otherwise configured to generate gas flow having sufficient mass and sufficient velocity to achieve the desired level of pressurized gas damping. Additionally, in a preferred arrangement, the elongated gas damping passages can be dimensioned, sized and/or otherwise configured such that one or more performance characteristics, such as peak Loss Stiffness, for example, of the system occur at approximately a desired or target frequency or otherwise within a desired or targeted frequency range. Non-limiting examples of targeted frequency ranges can include inputs within a range of from approximately 0.5 Hz to approximately 2 Hz and/or a range of from approximately 6 Hz to approximately 14 Hz.

Also, as discussed above, a gas spring and gas damper assembly in accordance with the subject matter of the present disclosure can include a combination of features and/or components suitable for generating pressurized gas damping at two or more predetermined or targeted frequencies or otherwise within two or more predetermined or otherwise targeted ranges of frequencies. For example, it will be appreciated that any combination of spring chambers, one or more end member chambers, one or more external damping chambers, one or more elongated gas damping passages and/or any additional control devices can be used.

The combination of cross-sectional area and overall length of the elongated gas damping passage can be dimensioned, sized and/or otherwise configured to generate gas flow having sufficient mass and sufficient velocity to achieve the desired level of pressurized gas damping. Generally, a gas spring and gas damper assembly in accordance with the subject matter of the present disclosure can include an elongated gas damping passage that has an overall length that is at least (10) times the maximum dimension (either actual or as a diametric equivalent) of the cross-sectional shape (e.g., the diameter of a circular passage) of the elongated gas damping passage. In a preferred arrangement, the overall length of the elongated gas damping passage will be at least twenty (20) times the maximum dimension of the cross-sectional shape. In some cases, the overall length of the elongated gas damping passage can be at least fifty (50) times the maximum dimension of the cross-sectional shape of the elongated gas damping passage.

It will be appreciated that the aforementioned maximum dimension of the cross-sectional shape of the elongated gas damping passage can be either actual or a theoretical equivalent dimension. For example, an actual diameter of a circular passage, a major diameter of an elliptical passage or a height or width of a rectangular passage could be used. For non-circular and/or irregularly-shaped passages, a theoretical equivalent maximum dimension could be used.

In accordance with the subject matter of the present disclosure, such an elongated damping passage is provided on or along end closure assembly 500 of gas spring and gas damper assembly AS1. End closure body 502 includes an opening or port 518 that extends into end closure wall 506 and is accessible from along surface portion 510. Cover plate 504 also includes an opening or port 520 that extends through the cover plate and is positioned to fluidically communicate with one or more features of end closure body 502 in an assembled condition. End closure body 502 includes an elongated damping passage 522 at least partially formed within end closure wall 506. In a preferred arrangement, elongated damping passage 522 has a first end 524 disposed in fluid communication with opening 520 of cover plate 504, and a second end 526 disposed in fluid communication with opening 518 in end closure wall 506. To aid in assembly and ensure that first end 524 of elongated damping passage 522 is assembled in fluid communication with opening 520 of cover plate 504, one or more indexing features can cooperatively interengage the end closure body and the cover plate. As non-limiting examples, holes 528 in cover plate 504 and projections 530 formed along end closure body 502 could be used. Additionally, or in the alternative, end closure wall 506 can include an extension wall portion 532 that projects axially outward from along surface portion 508 toward a distal edge (not identified) and extends peripherally around longitudinal axis AX. Cover plate 504 can be received and retained along surface portion 508 inside extension wall portion 532 such that the cover plate and extension wall portion are axially coextensive. In some cases, a press-fit engagement between the cover plate and the extension wall can be used to at least partially secure the cover plate on or along the end closure body.

In a preferred arrangement, elongated damping passage 522 can have an overall length that is at least approximately one and one-half (1½) times the outermost cross-sectional dimension of end closure assembly 500, such as is represented by reference dimension CD1, for example. In a preferred arrangement, the overall length of elongated damping passage is at least approximately two (2) times the outermost cross-sectional dimension of end closure assembly 500 and, more preferably, at least approximately four (4) times the outermost cross-sectional dimension of end closure assembly 500. In this manner, an elongated damping passage having an overall length that is substantially greater than the outermost cross-sectional dimension of the end closure assembly can be used.

Utilizing such a construction, end closure assembly 500 can secure flexible spring member 200 on or along end member assembly 400 while generating pressurized gas damping as pressurized gas flows between spring chamber 202 and end member chamber 436 through elongated damping passage 522 and openings 518 and 520. An advantage of the subject construction over other known configurations is that a cured-together or otherwise permanently attached assembly of flexible spring member 200 and end closure assembly 500 can be secured together in any rotational position or orientation with respect to end member assembly 400 without indexing or other rotational alignment between end member assembly 400 and the assembly of flexible spring member 200 and end closure assembly 500.

In the arrangement shown in FIGS. 7, 7A and 8-12, end closure wall 506 can include a passage surface 534 that at least partially defines elongated damping passage 522. It will be appreciated that passage surface 534 can have any suitable cross-sectional shape and/or profile. Elongated damping passage 522 is shown as having a spiral-like configuration. Such a spiral-like or similar configuration can be generated in any suitable manner. For example, the cross-sectional profile of passage surface 534 can be oriented transverse to axis AX and can be substantially-continuously rotated about the axis with the cross-sectional profile substantially-continuously displaced radially outward from adjacent axis AX to form the spiral-like configuration. In a preferred arrangement, such rotation of the cross-sectional profile of passage surface 534 can occur in an approximately single plane such that the spiral-like configuration of elongated damping passage 522 is disposed in a common plane that is oriented transverse to longitudinal axis AX.

In some cases, the cross-sectional profile of passage surface 534 can be open (i.e., not fully enclosed). In such cases, the corresponding elongated damping passage is open along one or more surface portions (e.g., surface portion 508) of end closure body 502. For example, the cross-sectional profile of passage surface 534 is shown as having an approximately U-shaped cross-sectional configuration. As such, elongated damping passage 522 is formed within end closure body 502 as an open channel that is accessible from along surface portion 508. It will be appreciated that other configurations and/or arrangements could alternately be used. In cases in which the cross-sectional profile of passage surface 534 is open or otherwise not fully enclosed, cover plate 504 extends across surface portion 508 to substantially inhibit or at least reduce pressurized gas transfer between adjacent rings or other sections of elongated damping passage 522 along surface portion 508. It will be appreciated that inhibiting or at least reducing such undesirable pressurized gas transfer may promote pressurized gas flow along elongated damping passage 522 and, thus, provide improved gas damping performance. It will be appreciated that such undesirable pressurized gas transfer can be inhibited or otherwise reduced in any suitable manner and through the use of any suitable components, features and/or elements. As one example, a quantity of sealing material and/or one or more sealing elements could be disposed between surface portion 508 and a surface portion 536 of cover plate 504 to at least partially form a substantially fluid-tight seal therebetween. As another example, a flowed material joint could be formed between surface portion 508 of end closure wall 506 and surface portion 536 of the cover plate. Such sealing arrangements are collectively schematically represented in FIG. 7A by dashed lines 538.

Figure 14:
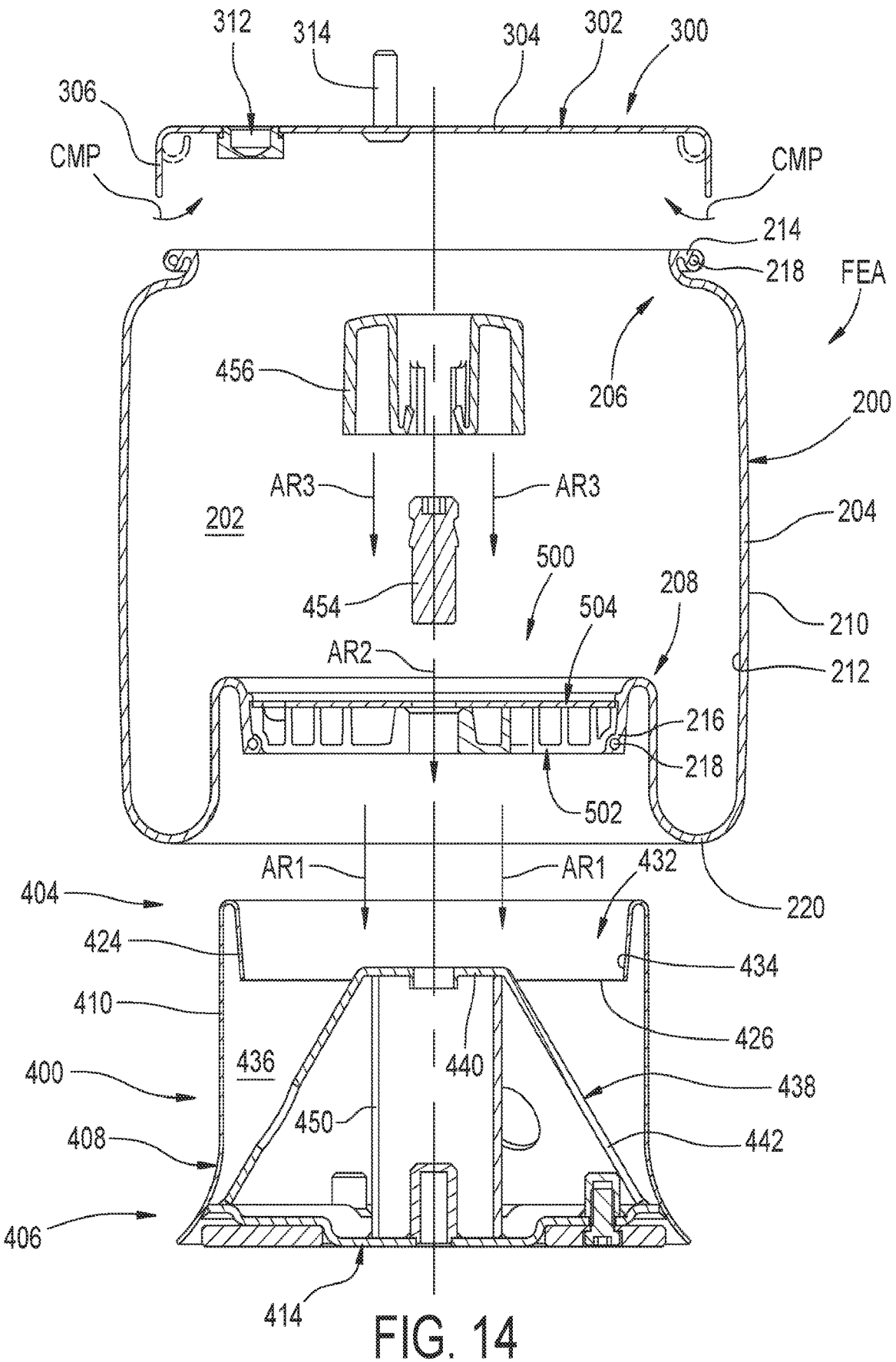
FIG. 14 is an exploded cross-sectional view of the exemplary gas spring and gas damper assembly in FIGS. 4-13 undergoing an exemplary method of assembly.

FIG. 14 illustrates components of gas spring and gas damper assembly AS1 undergoing an exemplary process or method of assembly in accordance with the subject matter of the present disclosure. As shown therein, flexible spring member and end closure assembly FEA is provided that includes flexible spring member 200 and end closure body 502 permanently attached to one another, as discussed above. End member 300 can be secured on or along end 206 of flexible spring member 200, such as by way of a crimped connection in which outer peripheral wall portion 306 of end member wall 302 is crimped or otherwise deformed at least partially around mounting bead 214 of flexible spring member 200, as is represented in FIG. 14 by arrows CMP, for example. End closure body 502 is displaced axially into position within open end 432 of end member 400 such that end 208 of flexible wall 204 is compressively captured between outer peripheral surface portion 512 of end closure body 502 and inner side wall portion 424 of the end member wall, such as is represented in FIG. 14 by arrows AR1, for example. In some cases, end closure body 502 can be axially displaced into open end 432 such that the end closure body is in abutting engagement with end wall portion 440 of the end member. End closure body 502 can be secured on or along end member 400, such as, for example, by threadably engaging bumper mount 454 with end wall portion 440 and thereby capturing the end closure body between the bumper mount and the end wall portion of end member 400, such as is represented by arrows AR2. If included, jounce bumper 456 can be receivingly engaged on or along bumper mount 454, such as is represented by arrows AR3, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

It is to be recognized and appreciated that terms such as "can", "may", "might" and the like are to be interpreted as being permissive rather than required. As such, any reference to items with which terms such as "can", "may", "might" and the like are used shall be interpreted as being optional rather than required by the subject matter of the present disclosure unless otherwise specifically set forth herein.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A flexible spring member and end closure assembly comprising:
   a flexible spring member having a longitudinal axis and including a flexible wall extending longitudinally between first and second ends and peripherally about said longitudinal axis to at least partially define a spring chamber;
   an end closure body including an end closure wall oriented transverse to said longitudinal axis with a first surface portion facing axially toward said spring chamber, a second surface portion facing axially away from said spring chamber, an outer peripheral surface portion, an end closure port extending into said end closure wall and accessible from along said second surface portion, and an elongated damping passage extending axially into said end closure wall in a spiral arrangement about said longitudinal axis, said elongated damping passage including a first passage end disposed in fluid communication with end closure port, a second passage end, and an open cross-sectional profile within said end closure body such that said elongated gas damping passage is open along said first surface portion of said end closure body; and,
   a cover plate on said end closure body along said first surface portion thereof, said cover plate extending across said open cross-sectional profile and thereby substantially enclosing said elongated damping passage, said cover plate including a cover plate port extending therethrough in fluid communication with said second passage end;
   said end closure body and said cover plate positioned along said second end of said flexible spring member with said cover plate disposed toward said spring chamber, said flexible wall permanently attached along said outer peripheral surface portion of said end closure body forming a substantially fluid-tight joint between said flexible spring member and said end closure body such that said flexible spring member and end closure assembly are securable on an associated end member with said end closure port disposed in any rotational position about said longitudinal axis independent of a rotational orientation of the associated end member.

2. A flexible spring member and end closure assembly according to claim 1, wherein said end closure body includes a bead seat along said outer peripheral surface portion adjacent said second surface portion, and said flexible spring member includes a mounting bead along said second end thereof that is permanently attached to said end closure body along said bead seat.

3. A flexible spring member and end closure assembly according to claim 1, wherein said end closure body includes an extension wall portion projecting axially outward from along said first surface portion toward a distal edge and extending peripherally around said longitudinal axis, and said cover plate is received and retained along said first surface portion of said end closure body inside said extension wall portion such that said cover plate and said extension wall portion are axially coextensive.

4. A flexible spring member and end closure assembly according to claim 1, wherein said end closure body includes a body indexing feature and said cover plate includes a plate indexing feature cooperative with said body indexing feature such that engagement of said plate indexing feature and said body indexing feature orients said cover plate port of said cover plate relative to said second passage end of said elongated damping passage of said end closure body.

5. A gas spring and gas damper assembly comprising:
a flexible spring member and end closure assembly according to claim 1; and,
a first end member operatively secured to said first end of said flexible spring member such that a substantially fluid-tight seal is formed therebetween.

6. A gas spring and gas damper assembly according to claim 5 further comprising a second end member disposed in spaced relation to said first end member and operatively engaging said second end of said flexible spring member such that a substantially fluid-tight connection is formed therewith.

7. A gas spring and gas damper assembly according to claim 6, wherein said second end member includes an end member wall that at least partially defines an end member chamber, said end member wall includes an inner side wall portion that at least partially defines an open end of said end member chamber disposed toward said spring chamber, said end closure body disposed within said open end of said second end member such that said second end of said flexible spring member is compressively captured between said outer peripheral surface portion of said end closure body and said inner side wall portion of said end member wall.

8. A gas spring and gas damper assembly according to claim 7, wherein said inner side wall portion has a frusto-conical shape extending toward a distal edge.

9. A gas spring and gas damper assembly according to claim 7, wherein said end member wall of said second end member is an outer shell wall and said second end member includes an inner support wall with an end wall portion spaced radially inward of said inner side wall portion of said outer shell wall such that said open end of said end member chamber is at least partially disposed between said inner side wall portion of said outer shell wall and said end wall portion of said inner support wall.

10. A gas spring and gas damper assembly according to claim 9, wherein said end closure body, said cover plate, and said second end of said flexible spring member extend into said open end of said end member chamber with said second surface portion of said end closure body positioned along said end wall portion of said inner support wall.

11. A gas spring and gas damper assembly according to claim 9, wherein said end closure body is secured to said end wall portion of said inner support wall.

12. A method of assembling a gas spring and gas damper assembly, said method comprising:
providing a flexible spring member that has a longitudinal axis and includes a flexible wall with a first end;
providing an end closure body including a first surface portion, a second surface portion facing opposite said first surface portion, an outer peripheral surface portion, an end closure port extending into said end closure wall and accessible from along said second surface portion, and an elongated damping passage extending axially into said end closure wall in a spiral arrangement about said longitudinal axis, said elongated damping passage including a first passage end disposed in fluid communication with said end closure port, a second passage end, and an open cross-sectional profile within said end closure body such that said elongated gas damping passage is open along said first surface portion of said end closure body;
permanently attaching said first end of said flexible wall to said outer peripheral surface portion of said end closure body thereby forming a flexible spring member and end closure assembly that at least partially defines a spring chamber;
supporting a cover plate on said end closure body in facing relation to said spring chamber and extending across said open cross-sectional profile thereby substantially enclosing said elongated gas damping passage, said cover plate including a cover plate port extending therethrough in fluid communication with said second passage end;
providing a first end member that includes an end member wall at least partially defining an end member chamber; and,
attaching said flexible spring member and end closure assembly to said first end member such that said spring chamber and said end member chamber are disposed in fluid communication with one another through said elongated gas damping passage with said flexible spring member and end closure assembly securable to said first end member with said end closure port disposed in any rotational position about said longitudinal axis independent of a rotational orientation of said first end member.

13. A method according to claim 12, wherein providing an end closure body includes providing an extension wall portion projecting axially outward from along said first surface portion toward a distal edge and extending peripherally around said longitudinal axis, and supporting said cover plate on said end closure body includes receiving and retaining said cover palate along said first surface portion of said end closure body inside said extension wall portion such that said cover plate and said extension wall portion are axially coextensive.

14. A method according to claim 12, wherein supporting said cover plate on said end closure body includes forming a press-fit engagement between said cover plate and said end closure body to at least partially secure said cover plate on said end closure body.

15. A method according to claim 12, wherein supporting said cover plate on said end closure body includes forming a seal between said cover plate and said end closure body.

16. A method according to claim 12, wherein providing said first end member includes providing an outer shell wall that at least partially defines said end member chamber, said outer shell wall including an inner side wall portion at least partially defining an open end of said end member chamber, said method further comprising positioning said end closure body within said open end of said first end member such that said end of said flexible spring member is compressively captured between said outer peripheral surface portion of said end closure body and said inner wall portion of said end member wall.

17. A method according to claim 16, wherein providing said first end member includes providing an inner support wall disposed within said end member chamber, said inner support wall including an end wall portion spaced radially inward of said inner side wall portion of said outer shell wall such that said open end of said first end member chamber is at least partially disposed therebetween, and attaching said flexible spring member and end closure assembly to said first end member includes securing said end closure body along said end wall portion of said inner support wall.

18. A method according to claim 12 further comprising providing a second end member and securing a second end of said flexible spring member to said second end member such that a substantially fluid-tight seal is formed therebetween.

19. A gas spring and gas damper assembly having a longitudinal axis, said gas spring and gas damper assembly comprising:
  a first end member including an outer shell wall and an inner support wall, said outer shell wall at least partially defining an end member chamber and including an outer side wall portion and an inner side wall portion with said inner side wall portion at least partially defining an open end of said end member chamber, said inner support wall including an end wall portion oriented transverse to longitudinal axis, said end wall portion disposed along said open end of said end member chamber and spaced radially inward of said inner side wall portion of said outer shell wall such that said open end is at least partially defined between said inner side wall portion of said outer shell wall and said end wall portion of said inner support wall; and,
  a flexible spring member and end closure assembly operatively connected to said first end member, said flexible spring member and end closure assembly including:
    a flexible spring member including a flexible wall extending longitudinally between first and second ends and peripherally about said longitudinal axis to at least partially define a spring chamber;
    an end closure body including an end closure wall with a first surface portion facing axially toward said spring chamber, a second surface portion facing axially away from said spring chamber, an outer peripheral surface portion, an end closure port extending through said end closure wall and accessible from along said second surface portion, and an elongated damping passage extending axially into said end closure wall in a spiral arrangement about said longitudinal axis, said elongated damping passage including a first passage end disposed in fluid communication with end closure port, a second passage end, and an open cross-sectional profile within said end closure body such that said elongated gas damping passage is open along said first surface portion of said end closure body; and,
    a cover plate on said end closure body across said open cross-sectional profile thereby substantially enclosing said elongated damping passage, said cover plate including a cover plate port extending therethrough in fluid communication with said second passage end;
    said end closure body and said cover plate oriented transverse to said longitudinal axis and positioned along said first end of said flexible spring member with said flexible wall permanently attached along said outer peripheral surface portion of said end closure body such that a substantially fluid-tight joint formed is between said flexible spring member and said end closure body;
    said end closure body and said cover plate disposed within said open end of said first end member such that: said first end of said flexible spring member is compressively captured between said outer peripheral surface portion of said end closure body and said inner wall portion of said end member wall; such that said second surface portion of said end closure body is supported said end wall portion of said inner support wall and said flexible spring member; and such that said flexible spring member and end closure assembly is securable on said first end member with said end closure port in any rotational position about said longitudinal axis independent of a rotational orientation of said first end member.

20. A gas spring and gas damper assembly according to claim 19, wherein said end closure body includes a body indexing feature and said cover plate includes a plate indexing feature cooperative with said body indexing feature such that engagement of said plate indexing feature and said body indexing feature orients said cover plate port of said cover plate relative to said second passage end of said elongated damping passage of said end closure body.

* * * * *